(12) United States Patent
Chau et al.

(10) Patent No.: US 11,682,228 B2
(45) Date of Patent: *Jun. 20, 2023

(54) ULTRASONIC FINGERPRINT SENSOR WITH A CONTACT LAYER OF NON-UNIFORM THICKNESS

(71) Applicant: InvenSense, Inc., San Jose, CA (US)

(72) Inventors: Quy Chau, San Jose, CA (US); Mei-Lin Chan, Milpitas, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,796

(22) Filed: Nov. 12, 2021

(65) Prior Publication Data

US 2022/0067324 A1 Mar. 3, 2022

Related U.S. Application Data

(63) Continuation of application No. 16/741,390, filed on Jan. 13, 2020, now Pat. No. 11,176,345.

(Continued)

(51) Int. Cl.
*G06V 40/13* (2022.01)
*G06V 40/12* (2022.01)
*G06V 10/143* (2022.01)

(52) U.S. Cl.
CPC ........ *G06V 40/1306* (2022.01); *G06V 10/143* (2022.01); *G06V 40/1329* (2022.01); *G06V 40/1365* (2022.01)

(58) Field of Classification Search
CPC ........... G06V 40/1306; G06V 40/1329; G06V 40/1365; G06V 10/143
See application file for complete search history.

(56) References Cited

U.S. PATENT DOCUMENTS 4,880,012 A 11/1989 Sato
5,575,286 A 11/1996 Weng et al.
(Continued)

FOREIGN PATENT DOCUMENTS

CN 1826631 A 8/2006
CN 102159334 A 8/2011
(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Premal R Patel

(57) ABSTRACT

An ultrasonic sensor includes a two-dimensional array of ultrasonic transducers, wherein the two-dimensional array of ultrasonic transducers is substantially flat, a contact layer having a non-uniform thickness overlying the two-dimensional array of ultrasonic transducers, and an array controller configured to control activation of ultrasonic transducers during an imaging operation. During the imaging operation, the array controller is configured to control a transmission frequency of activated ultrasonic transducers during the imaging operation, wherein a plurality of transmission frequencies are used during the imaging operation to account for an impact of an interference pattern caused by the non-uniform thickness of the contact layer, and is configured to capture at least one fingerprint image using the plurality of transmission frequencies.

20 Claims, 11 Drawing Sheets

Related U.S. Application Data

(60) Provisional application No. 62/875,479, filed on Jul. 17, 2019.

(56) References Cited

U.S. PATENT DOCUMENTS

| | | |
|---|---|---|
| 5,680,863 A | 10/1997 | Hossack et al. |
| 5,684,243 A | 11/1997 | Gururaja et al. |
| 5,808,967 A | 9/1998 | Yu et al. |
| 5,867,302 A | 2/1999 | Fleming |
| 5,911,692 A | 6/1999 | Hussain et al. |
| 6,071,239 A | 6/2000 | Cribbs et al. |
| 6,104,673 A | 8/2000 | Cole et al. |
| 6,289,112 B1 | 9/2001 | Jain et al. |
| 6,292,576 B1 | 9/2001 | Brownlee |
| 6,350,652 B1 | 2/2002 | Libera et al. |
| 6,428,477 B1 | 8/2002 | Mason |
| 6,483,932 B1 | 11/2002 | Martinez et al. |
| 6,500,120 B1 | 12/2002 | Anthony |
| 6,676,602 B1 | 1/2004 | Barnes et al. |
| 6,679,844 B2 | 1/2004 | Loftman et al. |
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,257,241 B2 | 8/2007 | Lo |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,739,912 B2 | 6/2010 | Schneider et al. |
| 3,018,010 A1 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,582,705 B2 | 2/2017 | Du |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,618,405 B2 | 4/2017 | Liu et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,933,319 B2 | 4/2018 | Li et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,006,824 B2 | 6/2018 | Tsai et al. |
| 10,275,638 B1 | 4/2019 | Yousefpor et al. |
| 10,315,222 B2 | 6/2019 | Salvia et al. |
| 10,322,929 B2 | 6/2019 | Soundara Pandian et al. |
| 10,325,915 B2 | 6/2019 | Salvia et al. |
| 10,387,704 B2 | 8/2019 | Dagan et al. |
| 10,445,547 B2 | 10/2019 | Tsai |
| 10,461,124 B2 | 10/2019 | Berger et al. |
| 10,478,858 B2 | 11/2019 | Lasiter et al. |
| 10,488,274 B2 | 11/2019 | Li et al. |
| 10,497,747 B2 | 12/2019 | Tsai et al. |
| 10,515,255 B2 | 12/2019 | Strohmann et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,726,231 B2 | 7/2020 | Tsai et al. |
| 10,755,067 B2 | 8/2020 | De Foras et al. |
| 11,107,858 B2 | 8/2021 | Berger et al. |
| 11,112,388 B2 | 9/2021 | Garlepp et al. |
| 2001/0016686 A1 | 8/2001 | Okada et al. |
| 2002/0062086 A1 | 5/2002 | Miele et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0094490 A1 | 5/2005 | Thomenius et al. |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2006/0052697 A1 | 3/2006 | Hossack et al. |
| 2006/0079777 A1 | 4/2006 | Karasawa |
| 2006/0210130 A1 | 9/2006 | Germond-Rouet et al. |
| 2006/0230605 A1 | 10/2006 | Schlote-Holubek et al. |
| 2006/0280346 A1 | 12/2006 | Machida |
| 2007/0016026 A1 | 1/2007 | Thomenius et al. |
| 2007/0046396 A1 | 3/2007 | Huang |
| 2007/0047785 A1 | 3/2007 | Jang et al. |
| 2007/0073135 A1 | 3/2007 | Lee et al. |
| 2007/0164632 A1 | 7/2007 | Adachi et al. |
| 2007/0202252 A1 | 8/2007 | Sasaki |
| 2007/0215964 A1 | 9/2007 | Khuri-Yakub et al. |
| 2007/0223791 A1 | 9/2007 | Shinzaki |
| 2007/0230754 A1 | 10/2007 | Jain et al. |
| 2008/0125660 A1 | 5/2008 | Yao et al. |
| 2008/0146938 A1 | 6/2008 | Hazard et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0163805 A1 | 6/2009 | Sunagawa et al. |
| 2009/0182237 A1 | 7/2009 | Angelsen et al. |
| 2009/0232367 A1 | 9/2009 | Shinzaki |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0063391 A1 | 3/2010 | Kanai et al. |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0208004 A1 | 8/2010 | Ottosson et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |

(56) References Cited

U.S. PATENT DOCUMENTS

| | | |
|---|---|---|
| 2012/0095335 A1 | 4/2012 | Sverdlik et al. |
| 2012/0095344 A1 | 4/2012 | Kristoffersen et al. |
| 2012/0095347 A1 | 4/2012 | Adam et al. |
| 2012/0147698 A1 | 6/2012 | Wong et al. |
| 2012/0179044 A1 | 7/2012 | Chiang et al. |
| 2012/0224041 A1 | 9/2012 | Monden |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127297 A1 | 5/2013 | Bautista et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294201 A1 | 11/2013 | Hajati |
| 2013/0294202 A1 | 11/2013 | Hajati |
| 2014/0003679 A1 | 1/2014 | Han et al. |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0294262 A1 | 10/2014 | Schuckers et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0105663 A1 | 4/2015 | Kiyose et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0324569 A1 | 11/2015 | Hong et al. |
| 2015/0345987 A1 | 12/2015 | Hajati |
| 2015/0357375 A1 | 12/2015 | Tsai et al. |
| 2015/0358740 A1 | 12/2015 | Tsai et al. |
| 2015/0362589 A1 | 12/2015 | Tsai |
| 2015/0371398 A1 | 12/2015 | Qiao et al. |
| 2016/0026840 A1 | 1/2016 | Li et al. |
| 2016/0041047 A1 | 2/2016 | Liu et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1 | 3/2016 | Du et al. |
| 2016/0070968 A1 | 3/2016 | Gu et al. |
| 2016/0086010 A1 | 3/2016 | Merrell et al. |
| 2016/0091378 A1 | 3/2016 | Tsai et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0117541 A1 | 4/2016 | Lu et al. |
| 2016/0180142 A1 | 6/2016 | Riddle et al. |
| 2016/0240768 A1 | 8/2016 | Fujii et al. |
| 2016/0296975 A1 | 10/2016 | Lukacs et al. |
| 2016/0299014 A1 | 10/2016 | Li et al. |
| 2016/0326477 A1 | 11/2016 | Fernandez-Alcon et al. |
| 2016/0350573 A1 | 12/2016 | Kitchens et al. |
| 2016/0358003 A1 | 12/2016 | Shen et al. |
| 2017/0004346 A1 | 1/2017 | Kim et al. |
| 2017/0004352 A1 | 1/2017 | Jonsson et al. |
| 2017/0330552 A1 | 1/2017 | Garlepp et al. |
| 2017/0032485 A1 | 2/2017 | Vemury |
| 2017/0059380 A1 | 3/2017 | Li et al. |
| 2017/0075700 A1 | 3/2017 | Abudi et al. |
| 2017/0076132 A1 | 3/2017 | Sezan et al. |
| 2017/0090024 A1 | 3/2017 | Kitchens et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0200054 A1 | 7/2017 | Du et al. |
| 2017/0219536 A1 | 8/2017 | Koch et al. |
| 2017/0231534 A1 | 8/2017 | Agassy et al. |
| 2017/0243049 A1 | 8/2017 | Dong |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1* | 11/2017 | Tsai ........................ B06B 1/06 |
| 2017/0325081 A1* | 11/2017 | Chrisikos ............... G01S 15/32 |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0344782 A1 | 11/2017 | Andersson |
| 2017/0357839 A1 | 12/2017 | Yazdandoost et al. |
| 2018/0025202 A1 | 1/2018 | Ryshtun et al. |
| 2018/0032788 A1 | 2/2018 | Krenzer et al. |
| 2018/0101711 A1 | 4/2018 | D'Souza et al. |
| 2018/0107852 A1 | 4/2018 | Fenrich et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0150679 A1 | 5/2018 | Kim et al. |
| 2018/0178251 A1 | 6/2018 | Foncellino et al. |
| 2018/0206820 A1 | 7/2018 | Anand et al. |
| 2018/0217008 A1 | 8/2018 | Li et al. |
| 2018/0225495 A1 | 8/2018 | Jonsson et al. |
| 2018/0229267 A1 | 8/2018 | Ono et al. |
| 2018/0268232 A1 | 9/2018 | Kim et al. |
| 2018/0276443 A1 | 9/2018 | Strohmann et al. |
| 2018/0276672 A1 | 9/2018 | Breed et al. |
| 2018/0329560 A1 | 11/2018 | Kim et al. |
| 2018/0341799 A1 | 11/2018 | Schwartz et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0012673 A1 | 1/2019 | Chakraborty et al. |
| 2019/0018123 A1 | 1/2019 | Narasimha-Iyer et al. |
| 2019/0043920 A1 | 2/2019 | Berger et al. |
| 2019/0046263 A1 | 2/2019 | Hayashida et al. |
| 2019/0057267 A1 | 2/2019 | Kitchens et al. |
| 2019/0073507 A1 | 3/2019 | D'Souza et al. |
| 2019/0087632 A1 | 3/2019 | Raguin et al. |
| 2019/0095015 A1 | 3/2019 | Han et al. |
| 2019/0102046 A1 | 4/2019 | Miranto et al. |
| 2019/0130083 A1 | 5/2019 | Agassy et al. |
| 2019/0171858 A1 | 6/2019 | Ataya et al. |
| 2019/0175035 A1 | 6/2019 | Van Der Horst et al. |
| 2019/0180069 A1 | 6/2019 | Akhbari et al. |
| 2019/0188441 A1 | 6/2019 | Hall et al. |
| 2019/0188442 A1 | 6/2019 | Flament et al. |

(56) References Cited

U.S. PATENT DOCUMENTS

| | | |
|---|---|---|
| 2019/0247887 A1 | 8/2019 | Salvia et al. |
| 2019/0311177 A1 | 10/2019 | Joo et al. |
| 2019/0325185 A1 | 10/2019 | Tang |
| 2019/0340455 A1 | 11/2019 | Jung et al. |
| 2019/0370518 A1 | 12/2019 | Maor et al. |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050820 A1 | 2/2020 | Iatsun et al. |
| 2020/0050828 A1 | 2/2020 | Li et al. |
| 2020/0074135 A1 | 3/2020 | Garlepp et al. |
| 2020/0111834 A1 | 4/2020 | Tsai et al. |
| 2020/0125710 A1 | 4/2020 | Andersson et al. |
| 2020/0147644 A1 | 5/2020 | Chang |
| 2020/0158694 A1 | 5/2020 | Garlepp et al. |
| 2020/0175143 A1 | 6/2020 | Lee et al. |
| 2020/0194495 A1 | 6/2020 | Berger et al. |
| 2020/0210666 A1 | 7/2020 | Flament |
| 2020/0250393 A1 | 8/2020 | Tsai et al. |
| 2020/0257875 A1 | 8/2020 | Hall et al. |
| 2020/0285882 A1 | 9/2020 | Skovgaard Christensen et al. |
| 2020/0302140 A1 | 9/2020 | Lu et al. |
| 2020/0342203 A1 | 10/2020 | Lin et al. |
| 2020/0355824 A1 | 11/2020 | Apte et al. |
| 2020/0400800 A1 | 12/2020 | Ng et al. |
| 2020/0410070 A1 | 12/2020 | Strohmann |
| 2020/0410193 A1 | 12/2020 | Wu |
| 2022/0043144 A1 | 2/2022 | Yanni et al. |
| 2022/0262161 A1 | 8/2022 | Zhao et al. |

FOREIGN PATENT DOCUMENTS

| | | |
|---|---|---|
| CN | 104415902 A | 3/2015 |
| CN | 105264542 A | 1/2016 |
| CN | 105378756 A | 3/2016 |
| CN | 106458575 B | 7/2018 |
| CN | 109196671 A | 1/2019 |
| CN | 109255323 A | 1/2019 |
| EP | 1214909 A1 | 6/2002 |
| EP | 2884301 A1 | 6/2015 |
| EP | 3086261 A2 | 10/2016 |
| EP | 1534140 B1 | 1/2019 |
| EP | 3292508 B1 | 12/2020 |
| EP | 3757884 A1 | 12/2020 |
| JP | 2011040467 A | 2/2011 |
| JP | 2014183229 A | 9/2014 |
| TW | 201531701 A | 8/2015 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |
| WO | 2016022439 A1 | 2/2016 |
| WO | 2016040333 A2 | 3/2016 |
| WO | 2016053587 A1 | 4/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192890 A1 | 11/2017 |
| WO | 2017192895 A1 | 11/2017 |
| WO | 2017192899 A1 | 11/2017 |
| WO | 2017196678 A1 | 11/2017 |
| WO | 2017196682 A1 | 11/2017 |
| WO | 2017192903 A3 | 12/2017 |
| WO | 2018148332 A1 | 8/2018 |
| WO | 2019005487 A1 | 1/2019 |
| WO | 2019164721 A1 | 8/2019 |
| WO | 2020081182 A1 | 4/2020 |

OTHER PUBLICATIONS

ISA/EP, International Search Report and Written Opinion for International Application No. PCT/US2017/031439, 10 pages, dated Jun. 20, 2017.

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Tang, et al., "11.2 3D Ultrasonic Fingerprint Sensor-on-a-Chip", 2016 IEEE International Solid-State Circuits Conference, IEEE, Jan. 31, 2016, 202-203.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

ISA/EP, Partial International Search Report for International Application No. PCT/US2019/034032, 8 pages, dated Sep. 12, 2019, 8.

EP Office Action, dated Oct. 9, 2021, 6 pages.

ISA/EP, International Search Report and Written Opinion for International Application # PCT/US2018/063431, pp. 1-15, dated Feb. 5, 2019.

ISA/EP, International Search Report and Written Opinion for International Application # PCT/US2019/015020, pp. 1-23, dated Jul. 1, 2019.

ISA/EP, International Search Report and Written Opinion for International Application # PCT/US2019/023440, pp. 1-10, dated Jun. 4, 2019.

ISA/EP, International Search Report and Written Opinion for International Application No. PCT/US2017/031120, 12 pages, dated Aug. 29, 2017.

ISA/EP, International Search Report and Written Opinion for International Application No. PCT/US2017/031127, 13 pages, dated Sep. 1, 2017.

ISA/EP, International Search Report and Written Opinion for International Application No. PCT/US2017/031134, 12 pages, dated Aug. 30, 2017.

ISA/EP, International Search Report and Written Opinion for International Application No. PCT/US2017/031140, 18 pages, dated Nov. 2, 2017.

ISA/EP, International Search Report and Written Opinion for International Application No. PCT/US2017/031421 13 pages, dated Jun. 21, 2017.

(56) References Cited

OTHER PUBLICATIONS

ISA/EP, International Search Report and Written Opinion for International Application No. PCT/US2017/031426 13 pages, dated Jun. 22, 2017.
ISA/EP, International Search Report and Written Opinion for International Application No. PCT/US2017/031431, 14 pages, dated Aug. 1, 2017.
ISA/EP, International Search Report and Written Opinion for International Application No. PCT/US2017/031434, 13 pages, dated Jun. 26, 2017.
ISA/EP, International Search Report and Written Opinion for International Application No. PCT/US2017/031824, 18 pages, dated Sep. 22, 2017.
ISA/EP, International Search Report and Written Opinion for International Application No. PCT/US2017/031827, 16 pages, dated Aug. 1, 2017.
ISA/EP, International Search Report and Written Opinion for International Application No. PCT/US2017/031831, 12 pages, dated Jul. 21, 2017.
ISA/EP, International Search Report and Written Opinion for International Application No. PCT/US2018/037364, 10 pages, dated Sep. 3, 2018.
ISA/EP, International Search Report and Written Opinion for International Application No. PCT/US2019061516, 14 pages, dated Mar. 12, 2020.
ISA/EP, International Search Report and Written Opinion for International Application No. PCT/US2020/033854, 16 pages, dated Nov. 3, 2020.
ISA/EP, International Search Report and Written Opinion for International Application No. PCT/US2020/039208, 10 pages, dated Oct. 9, 2020.
ISA/EP, International Search Report and Written Opinion for International Application No. PCT/US2020/039452, 11 pages, dated Sep. 9, 2020.
ISA/EP, International Search Report and Written Opinion for International Application No. PCT/US2020/042427, 18 pages, dated Dec. 14, 2020.
ISA/EP, International Search Report and Written Opinion for International Application No. PCT/US2020/042428, 9 pages, dated Oct. 26, 2020.
ISA/EP, International Search Report and Written Opinion for International Application No. PCT/US2021/021412, 12 pages, dated Jun. 9, 2021.
ISA/EP, International Search Report for International Application No. PCT/US2017/031826, 16 pages, dated Feb. 27, 2018.
ISA/EP, Partial International Search Report for International Application No. PCT/US2017/031140, 13 pages, dated Aug. 29, 2017.
ISA/EP, Partial International Search Report for International Application PCT/US2017/031826, 12 pages, dated Nov. 30, 2017.
ISA/EP, Partial Search Report and Provisional Opinion for International Application No. PCT/US2020/042427, 13 pages, dated Oct. 26, 2020.
ISA/EP, Partial Search Report for International Application No. PCT/US2020/033854, 10 pages, dated Sep. 8, 2020.
"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf—[retrieved on Jan. 24, 2019], Aug. 9, 2017, 1-8.
Office Action for CN App No. 201780029016.7 dated Mar. 24, 2020, 7 pages.
Office Action for CN App No. 201780029016.7 dated Sep. 25, 2020, 7 pages.
"Receiver Thermal Noise Threshold", Fisher Telecommunication Services, Satellite Communications. Retrieved from the Internet URL:https://web.archive.org/web/20171027075705/http//www.fishercom.xyz:80/satellite-communications/receiver-thermal-noise-threshold.html, Oct. 27, 2017, 3.
"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.
Taiwan Application No. 106114623, 1st Office Action, dated Aug. 5, 2021, pp. 1-8.
"TMS320C5515 Fingerprint Development Kit (FDK) Hardware Guide", Texas Instruments, Literature No. SPRUFX3, XP055547651, Apr. 2010, 1-26.
"ZTE V7 MAX. 5,5" smartphone on MediaTeck Helio P10 cpu; Published on Apr. 20, 2016; https://www.youtube.com/watch?v=ncNCbpkGQzU (Year: 2016)".
Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.
Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.
Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.
Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.
Rozen, et al., "Air-Coupled Aluminum Nitride Piezoelectric Micromachined Ultrasonic Transducers at 0.3 MHZ to 0.9 MHZ", 2015 28th IEEE International Conference on Micro Electro Mechanical Systems (MEMS), IEEE, Jan. 18, 2015, 921-924.
Tang, et al., "Pulse-echo ultrasonic fingerprint sensor on a chip", 2015 Transducers, 2015 18th International Conference on Solid-State Sensors, Actuators and Microsystems, Apr. 1, 2015, 674-677.
Zhou, et al., "Partial Fingerprint Reconstruction with Improved Smooth Extension", Network and System Security, Springer Berlin Heidelberg, Jun. 3, 2013, 756-762.
EP Office Action, for Application 17724184.1, dated Oct. 12, 2021, 6 pages.
EP Office Action, for Application 17725017.2 dated Feb. 25, 2022, 7 pages.
European Patent Office, Office Action, App 17725018, pp. 5, dated Oct. 25, 2021.
Office Action for CN App No. 201780027434.2 dated Oct. 21, 2022, 10 pages.
Office Action for CN App No. 201780027435.7 dated Sep. 9, 2022, 9 pages.
Office Action for CN App No. 201780029059.5 dated Nov. 11, 2022, 11 pages.
Office Action for CN App No. 2020800377355 dated Aug. 3, 2022, 8 pages.

\* cited by examiner

ULTRASONIC FINGERPRINT SENSOR WITH A CONTACT LAYER OF NON-UNIFORM THICKNESS

RELATED APPLICATIONS

This application claims priority to and the benefit of co-pending U.S. patent application Ser. No. 16/741,390, filed on Jan. 13, 2020, entitled "ULTRASONIC FINGERPRINT SENSOR WITH A CONTACT LAYER OF NON-UNIFORM THICKNESS," by Quy Chau et al., and assigned to the assignee of the present application, which is incorporated herein by reference in its entirety.

U.S. patent application Ser. No. 16/741,390 claims priority to and the benefit of then co-pending U.S. Provisional Patent Application 62/875,479, filed on Jul. 17, 2019, entitled "FINGERPRINT IMAGING UNDER CURVED SURFACE," by Quy Chau et al., and assigned to the assignee of the present application, which is incorporated herein by reference in its entirety.

BACKGROUND

Fingerprint sensors have become ubiquitous in mobile devices as well as other applications for authenticating a user's identity. They provide a fast and convenient way for the user to unlock a device, provide authentication for payments, etc. Current fingerprint sensors are typically area sensors that obtain a two-dimensional image of the user's finger area presented to the sensor. Different technologies can be used to image the finger such as capacitive, ultrasound, and optical sensing. Once an image is obtained, that image is processed by a matcher to extract features and to compare against stored images to authenticate the user. As such, accuracy of captured images is essential to the performance of image matching for user authentication.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1A:
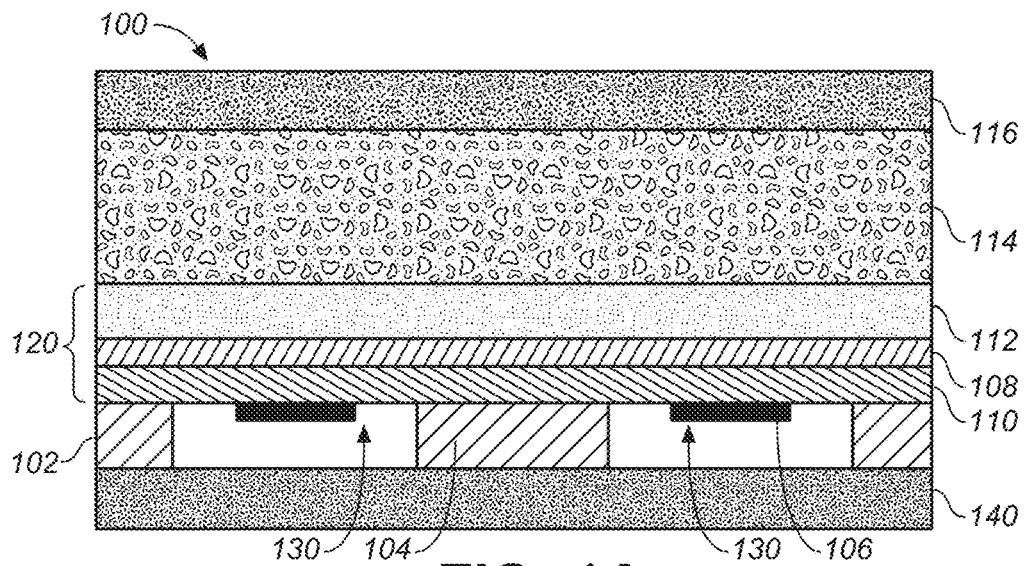
FIG. 1A is a diagram illustrating a piezoelectric micromachined ultrasonic transducer (PMUT) device having a center pinned membrane, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "performing," "controlling," "capturing," "activating," "generating," "combining," "transmitting," "receiving," "repeating," "measuring," "selecting," "determining," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example piezoelectric micromachined ultrasonic transducer (PMUT), in accordance with various embodiments. Example arrays including PMUT devices are then described. Example operations of example arrays of ultrasonic transducers (e.g., PMUT devices) are then further described, including the use of multiple PMUT devices to form a beam for capturing a pixel. Examples of the ultrasonic fingerprint sensors having contact layers with non-uniform thickness are then described. Examples of accounting for non-uniform thickness of a contact layer in an ultrasonic fingerprint sensor are then described.

Fingerprint sensors, in accordance with the described embodiments, are used for capturing fingerprint images that are used for performing fingerprint authentication. As the use of fingerprint sensors proliferates, there is a desire to include fingerprint sensors in devices having varying form factors. In many potential use cases, an ultrasonic fingerprint sensor that is substantially flat is overlaid with a contact layer that is not flat (e.g., has a curved profile, rounded edges, etc.), thus having a varying thickness. This variation in material thickness results in a skewing or redirection of the return signal level (e.g., reflected ultrasonic beam), which can result in artifacts related to contact layer curvature and acoustic wavelength. Moreover, a contact layer having a non-uniform thickness will cause an interference pattern to be generated in a captured image due to the difference in interference between the transmitted and received ultrasonic waves. In some locations, the transmitted and received ultrasonic waves will be in phase, while in other locations the transmitted and received ultrasonic waves will be out of phase, and gradients in between, causing an interference pattern that may obscure the underlying image being captured (e.g., a fingerprint). Embodiments described herein account for the interference pattern caused by the varying thickness of the contact layer.

Embodiments described herein provide a sensor device including a two-dimensional array of ultrasonic transducers, wherein the two-dimensional array of ultrasonic transducers is substantially flat, a contact layer having a non-uniform thickness overlying the two-dimensional array of ultrasonic transducers, and an array controller configured to control activation of ultrasonic transducers during an imaging operation for imaging a plurality of pixels. During the imaging operation, the array controller is configured to control a transmission frequency of activated ultrasonic transducers during the imaging operation, wherein a plurality of transmission frequencies are used during the imaging operation to account for an impact of an interference pattern caused by the non-uniform thickness of the contact layer, and is configured to capture at least one fingerprint image using the plurality of transmission frequencies.

At least one fingerprint image is captured using the plurality of transmission frequencies. In one embodiment, a plurality of fingerprint images is captured using the plurality of transmission frequencies. In one embodiment, the plurality of transmission frequencies operate to cancel out the interference pattern of the plurality of fingerprint images. In another embodiment, a plurality of portions of a fingerprint image is captured using the plurality of transmission frequencies.

The captured at least one fingerprint image is combined to generate an output fingerprint image. In one embodiment, the plurality of fingerprint images is combined into a single output fingerprint image, wherein the single output fingerprint image reduces the impact of the interference pattern caused by the non-uniform thickness of the contact layer. In one embodiment, the plurality of fingerprint images is combined into a single output fingerprint image by averaging the plurality of fingerprint images. In another embodiment, the plurality of fingerprint images is combined into a single output fingerprint image by using convolution.

In another embodiment, the plurality of portions of the fingerprint image is combined into a single output fingerprint image. In one embodiment, the plurality of transmission frequencies provide constructive interference for corresponding portions of the plurality of portions of the fingerprint image during the imaging operation. In one embodiment, the portions of the plurality of portions include a plurality of pixels. In another embodiment, the portions of the plurality of portions include single pixels.

In other embodiments, an image is captured at an ultrasonic sensor using a temperature to control the transmission frequency, according to embodiments. An imaging operation is performed at a two-dimensional array of ultrasonic transducers of the ultrasonic sensor to generate a plurality of pixels, wherein the ultrasonic sensor has a contact layer having a non-uniform thickness overlying the two-dimensional array of ultrasonic transducers and wherein the two-dimensional array of ultrasonic transducers is substantially flat. A temperature of the ultrasonic sensor is determined. A transmission frequency of activated ultrasonic transducers is controlled during the imaging operation, wherein the transmission frequency is controlled based on the temperature of the ultrasonic sensor. The transmission frequency is selected to generate a constant interference pattern across all temperatures. At least one fingerprint image is captured using the transmission frequency. An interference pattern correction is applied to the fingerprint image to generate the output fingerprint image.

Piezoelectric Micromachined Ultrasonic Transducer (PMUT)

Systems and methods disclosed herein, in one or more aspects provide efficient structures for an acoustic transducer (e.g., a piezoelectric micromachined actuated transducer or PMUT). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. In addition, the word "example" is used herein to mean serving as an example, instance, or illustration.

Embodiments described herein provide ultrasonic fingerprint sensors having non-uniform contact layers. It should be appreciated that different types of ultrasonic fingerprint sensors having different architectures may be utilized herein. For instance, some architectures include an array of ultrasonic transducers (e.g., PMUTs), embodiments of which are described herein. In some embodiments, the ultrasonic transducers may be bulk piezo actuator elements, e.g., lead zirconate titanate (PZT). Other architectures may utilize a film-based design. Although embodiments are described herein with respect to an array of ultrasonic transducers, the methods and techniques may be applied to other ultrasonic sensing architectures where the control of the operating parameters of different segments of the sensors can be adjusted separately to correct for the non-uniform contact surface. The embodiments described herein are with respect to sensors with a non-uniform contact layer, but the techniques and principles discussed may in some situations also be used to improve performance of sensors with uniform contact surfaces.

FIG. 1A is a diagram illustrating a PMUT device 100 having a center pinned membrane, according to some embodiments. PMUT device 100 includes an interior pinned membrane 120 positioned over a substrate 140 to define a cavity 130. In one embodiment, membrane 120 is attached both to a surrounding edge support 102 and interior support 104. In one embodiment, edge support 102 is connected to an electric potential. Edge support 102 and interior support 104 may be made of electrically conducting materials, such as and without limitation, aluminum, molybdenum, or titanium. Edge support 102 and interior support 104 may also be made of dielectric materials, such as silicon dioxide, silicon nitride or aluminum oxide that have electrical connections on the sides or in vias through edge support 102 or interior support 104, electrically coupling lower electrode 106 to electrical wiring in substrate 140.

In one embodiment, both edge support 102 and interior support 104 are attached to a substrate 140. In various embodiments, substrate 140 may include at least one of, and without limitation, silicon or silicon nitride. It should be appreciated that substrate 140 may include electrical wirings and connection, such as aluminum or copper. In one embodiment, substrate 140 includes a CMOS logic wafer bonded to edge support 102 and interior support 104. In one embodiment, the membrane 120 comprises multiple layers. In an example embodiment, the membrane 120 includes lower electrode 106, piezoelectric layer 110, and upper electrode 108, where lower electrode 106 and upper electrode 108 are coupled to opposing sides of piezoelectric layer 110. As shown, lower electrode 106 is coupled to a lower surface of piezoelectric layer 110 and upper electrode 108 is coupled to an upper surface of piezoelectric layer 110. It should be appreciated that, in various embodiments, PMUT device 100 is a microelectromechanical (MEMS) device.

In one embodiment, membrane 120 also includes a mechanical support layer 112 (e.g., stiffening layer) to mechanically stiffen the layers. In various embodiments, mechanical support layer 112 may include at least one of, and without limitation, silicon, silicon oxide, silicon nitride, aluminum, molybdenum, titanium, etc. In one embodiment, PMUT device 100 also includes an acoustic coupling layer 114 above membrane 120 for supporting transmission of acoustic signals. It should be appreciated that acoustic coupling layer can include air, liquid, gel-like materials, epoxy, or other materials for supporting transmission of acoustic signals. In one embodiment, PMUT device 100 also includes platen layer 116 above acoustic coupling layer 114 for containing acoustic coupling layer 114 and providing a contact surface for a finger or other sensed object with PMUT device 100. It should be appreciated that, in various embodiments, acoustic coupling layer 114 provides a contact surface, such that platen layer 116 is optional. Moreover, it should be appreciated that acoustic coupling layer 114 and/or platen layer 116 may be included with or used in conjunction with multiple PMUT devices. For example, an array of PMUT devices may be coupled with a single acoustic coupling layer 114 and/or platen layer 116. It should be appreciated that platen layer 116 can include one or more materials, including without limitation: glass, plastic, metal (e.g., aluminum, titanium, stainless steel), etc. In some embodiments, platen 116 is a display device (e.g., an organic light emitting diode (OLED) display device) overlying one or more PMUT devices. In such an embodiment, platen 116 includes multiple layers of the display device.

Figure 1B:
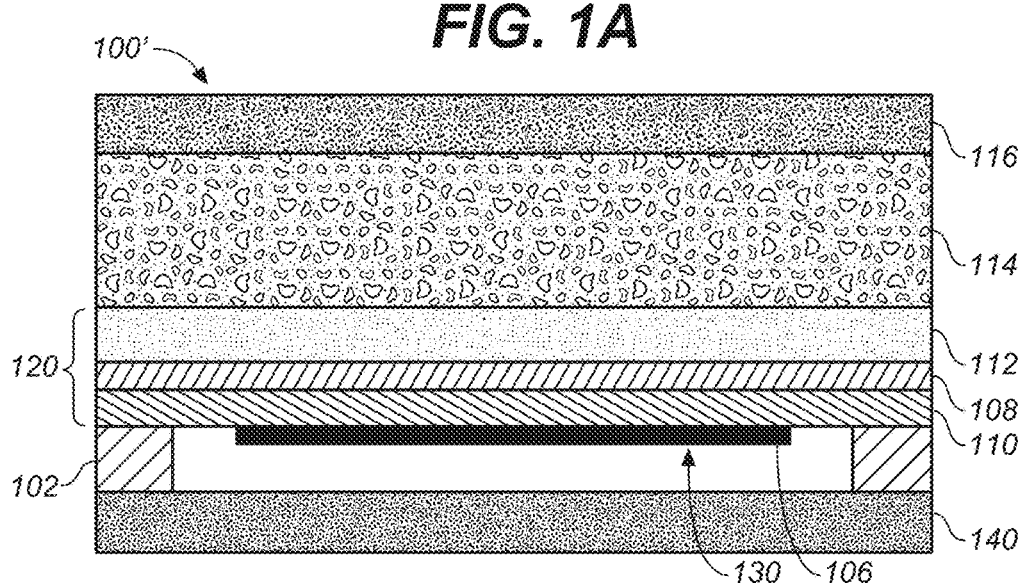
FIG. 1B is a diagram illustrating a PMUT device having an unpinned membrane, according to some embodiments.

FIG. 1B is identical to FIG. 1A in every way, except that the PMUT device 100' of FIG. 1B omits the interior support 104 and thus membrane 120 is not pinned (e.g., is "unpinned"). There may be instances in which an unpinned membrane 120 is desired. However, in other instances, a pinned membrane 120 may be employed.

Figure 2:
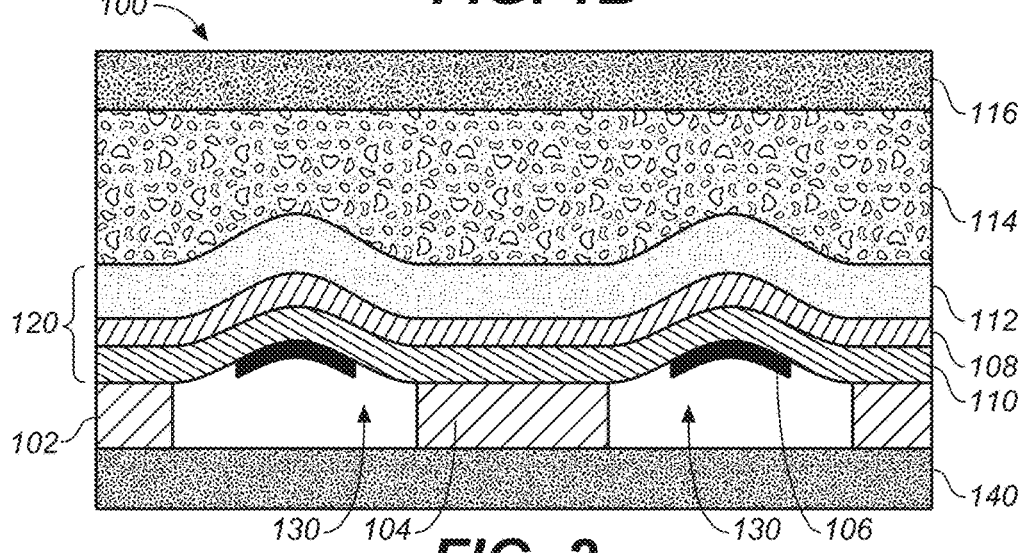
FIG. 2 is a diagram illustrating an example of membrane movement during activation of a PMUT device, according to some embodiments.

FIG. 2 is a diagram illustrating an example of membrane movement during activation of PMUT device 100, according to some embodiments. As illustrated with respect to FIG. 2, in operation, responsive to an object proximate platen layer 116, the electrodes 106 and 108 deliver a high frequency electric charge to the piezoelectric layer 110, causing those portions of the membrane 120 not pinned to the surrounding edge support 102 or interior support 104 to be displaced upward into the acoustic coupling layer 114. This generates a pressure wave that can be used for signal probing of the object. Return echoes can be detected as pressure waves causing movement of the membrane, with compression of the piezoelectric material in the membrane causing an electrical signal proportional to amplitude of the pressure wave.

The described PMUT device 100 can be used with almost any electrical device that converts a pressure wave into mechanical vibrations and/or electrical signals. In one aspect, the PMUT device 100 can comprise an acoustic sensing element (e.g., a piezoelectric element) that generates and senses ultrasonic sound waves. An object in a path of the generated sound waves can create a disturbance (e.g., changes in frequency or phase, reflection signal, echoes, etc.) that can then be sensed. The interference can be analyzed to determine physical parameters such as (but not limited to) distance, density and/or speed of the object. As an example, the PMUT device 100 can be utilized in various applications, such as, but not limited to, fingerprint or physiologic sensors suitable for wireless devices, industrial systems, automotive systems, robotics, telecommunications, security, medical devices, etc. For example, the PMUT device 100 can be part of a sensor array comprising a plurality of ultrasonic transducers deposited on a wafer, along with various logic, control and communication electronics. A sensor array may comprise homogenous or identical PMUT devices 100, or a number of different or heterogonous device structures.

In various embodiments, the PMUT device 100 employs a piezoelectric layer 110, comprised of materials such as, but not limited to, aluminum nitride (AlN), scandium doped aluminum nitride (ScAlN) lead zirconate titanate (PZT), quartz, polyvinylidene fluoride (PVDF), and/or zinc oxide, to facilitate both acoustic signal production and sensing. The piezoelectric layer 110 can generate electric charges under mechanical stress and conversely experience a mechanical strain in the presence of an electric field. For example, the piezoelectric layer 110 can sense mechanical vibrations caused by an ultrasonic beam and produce an electrical charge at the frequency (e.g., ultrasonic frequency) of the vibrations. Additionally, the piezoelectric layer 110 can generate an ultrasonic wave by vibrating in an oscillatory fashion that might be at the same frequency (e.g., ultrasonic frequency) as an input current generated by an alternating current (AC) voltage applied across the piezoelectric layer 110. It should be appreciated that the piezoelectric layer 110 can include almost any material (or combination of materials) that exhibits piezoelectric properties, such that the structure of the material does not have a center of symmetry and a tensile or compressive stress applied to the material alters the separation between positive and negative charge sites in a cell causing a polarization at the surface of the material. The polarization is directly proportional to the applied stress and is direction dependent so that compressive and tensile stresses results in electric fields of opposite polarizations.

Figure 10:
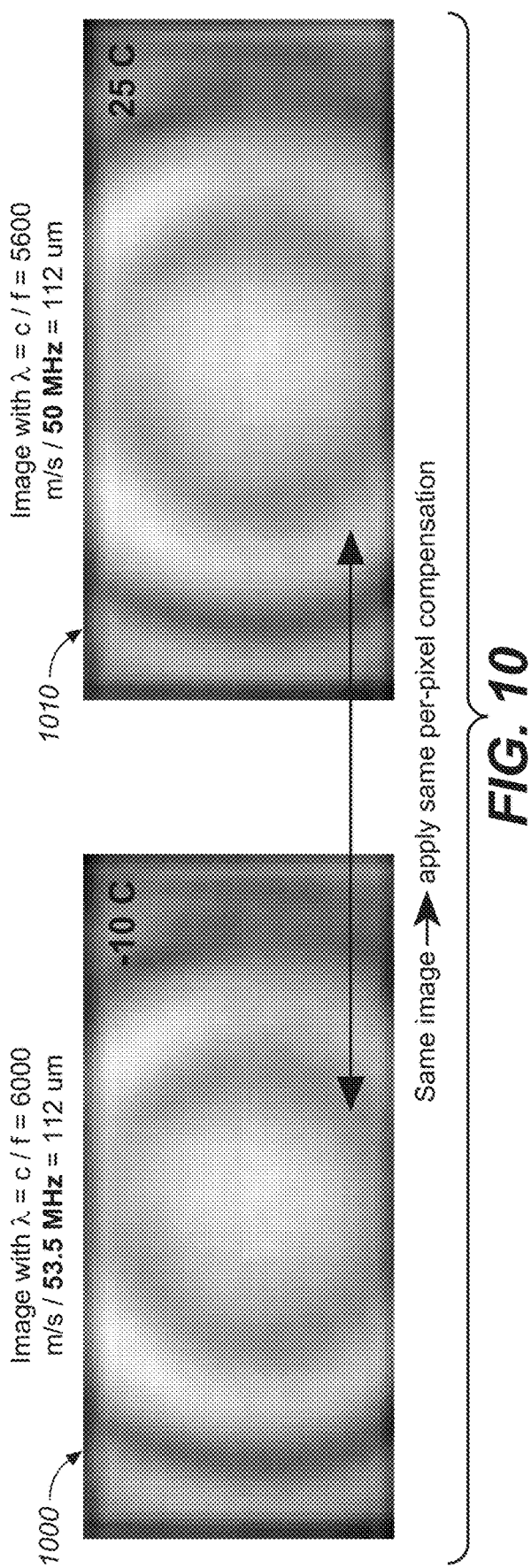
FIG. 10 illustrates an example of adapting a transmission frequency used for image capture by an ultrasonic fingerprint sensor according to temperature, to obtain a constant wavelength, according to an embodiment.

Further, the PMUT device 100 comprises electrodes 106 and 108 that supply and/or collect the electrical charge to/from the piezoelectric layer 110. It should be appreciated that electrodes 106 and 108 can be continuous and/or patterned electrodes (e.g., in a continuous layer and/or a patterned layer). For example, as illustrated, electrode 106 is a patterned electrode and electrode 108 is a continuous electrode. As an example, electrodes 106 and 108 can be comprised of almost any metal layers, such as, but not limited to, Aluminum (Al)/Titanium (Ti), Molybdenum (Mo), etc., which are coupled with and on opposing sides of the piezoelectric layer 110. In one embodiment, PMUT device also includes a third electrode, as illustrated in FIG. 10 and described below.

According to an embodiment, the acoustic impedance of acoustic coupling layer 114 is selected to be similar to the acoustic impedance of the platen layer 116, such that the acoustic wave is efficiently propagated to/from the membrane 120 through acoustic coupling layer 114 and platen layer 116. As an example, the platen layer 116 can comprise various materials having an acoustic impedance in the range between 0.8 to 4 MRayl, such as, but not limited to, plastic, resin, rubber, Teflon, epoxy, etc. In another example, the platen layer 116 can comprise various materials having a high acoustic impedance (e.g., an acoustic impendence greater than 10 MRayl), such as, but not limited to, glass, aluminum-based alloys, sapphire, etc. Typically, the platen layer 116 can be selected based on an application of the sensor. For instance, in fingerprinting applications, platen layer 116 can have an acoustic impedance that matches (e.g., exactly or approximately) the acoustic impedance of human skin (e.g., $1.6 \times 10^6$ Rayl). Further, in one aspect, the platen layer 116 can further include a thin layer of anti-scratch material. In various embodiments, the anti-scratch layer of the platen layer 116 is less than the wavelength of the acoustic wave that is to be generated and/or sensed to provide minimum interference during propagation of the acoustic wave. As an example, the anti-scratch layer can comprise various hard and scratch-resistant materials (e.g., having a Mohs hardness of over 7 on the Mohs scale), such as, but not limited to sapphire, glass, MN, Titanium nitride (TiN), Silicon carbide (SiC), diamond, etc. As an example, PMUT device 100 can operate at 20 MHz and accordingly, the wavelength of the acoustic wave propagating through the acoustic coupling layer 114 and platen layer 116 can be 70-150 microns. In this example scenario, insertion loss can be reduced and acoustic wave propagation efficiency can be improved by utilizing an anti-scratch layer having a thickness of 1 micron and the platen layer 116 as a whole having a thickness of 1-2 millimeters. It is noted that the term "anti-scratch material" as used herein relates to a material that is resistant to scratches and/or scratch-proof and provides substantial protection against scratch marks.

In accordance with various embodiments, the PMUT device 100 can include metal layers (e.g., Aluminum (Al)/Titanium (Ti), Molybdenum (Mo), etc.) patterned to form electrode 106 in particular shapes (e.g., ring, circle, square, octagon, hexagon, etc.) that are defined in-plane with the membrane 120. Electrodes can be placed at a maximum strain area of the membrane 120 or placed at close to either or both the surrounding edge support 102 and interior support 104. Furthermore, in one example, electrode 108 can be formed as a continuous layer providing a ground plane in contact with mechanical support layer 112, which can be formed from silicon or other suitable mechanical stiffening material. In still other embodiments, the electrode 106 can be routed along the interior support 104, advantageously reducing parasitic capacitance as compared to routing along the edge support 102.

For example, when actuation voltage is applied to the electrodes, the membrane 120 will deform and move out of plane. The motion then pushes the acoustic coupling layer 114 it is in contact with and an acoustic (ultrasonic) wave is generated. Oftentimes, vacuum is present inside the cavity 130 and therefore damping contributed from the media within the cavity 130 can be ignored. However, the acoustic coupling layer 114 on the other side of the membrane 120 can substantially change the damping of the PMUT device 100. For example, a quality factor greater than 20 can be observed when the PMUT device 100 is operating in air with atmosphere pressure (e.g., acoustic coupling layer 114 is air) and can decrease lower than 2 if the PMUT device 100 is operating in water (e.g., acoustic coupling layer 114 is water).

Figure 3:
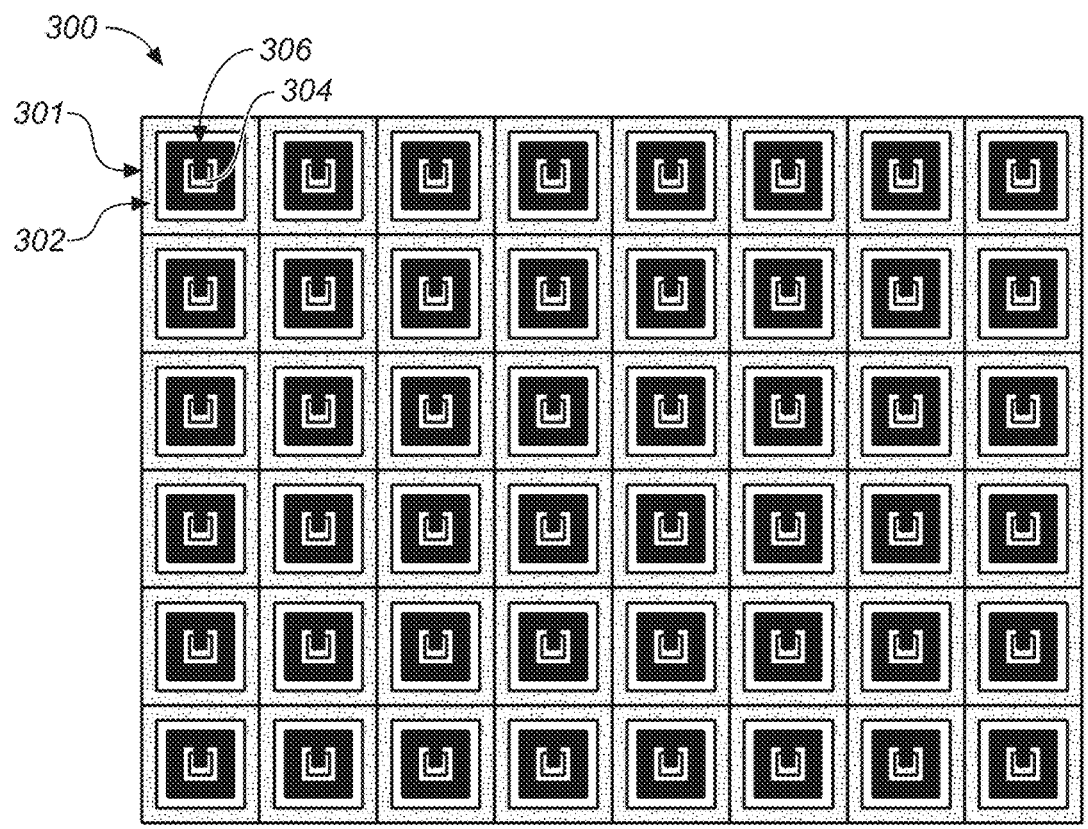
FIG. 3 illustrates an example array of square-shaped PMUT devices, according to some embodiments.

FIG. 3 illustrates an example two-dimensional array 300 of square-shaped PMUT devices 301 formed from PMUT devices having a substantially square shape similar to that discussed in conjunction with FIGS. 1A, 1B, and 2. Layout of square surrounding edge support 302, interior support 304, and square-shaped lower electrode 306 surrounding the interior support 304 are illustrated, while other continuous layers are not shown for clarity. As illustrated, array 300 includes columns of square-shaped PMUT devices 301 that are in rows and columns. It should be appreciated that rows or columns of the square-shaped PMUT devices 301 may be offset. Moreover, it should be appreciated that square-shaped PMUT devices 301 may contact each other or be spaced apart. In various embodiments, adjacent square-shaped PMUT devices 301 are electrically isolated. In other embodiments, groups of adjacent square-shaped PMUT devices 301 are electrically connected, where the groups of adjacent square-shaped PMUT devices 301 are electrically isolated.

In operation, during transmission, selected sets of PMUT devices in the two-dimensional array can transmit an acoustic signal (e.g., a short ultrasonic pulse) and during sensing, the set of active PMUT devices in the two-dimensional array can detect an interference of the acoustic signal with an object (in the path of the acoustic wave). The received interference signal (e.g., generated based on reflections, echoes, etc. of the acoustic signal from the object) can then be analyzed. As an example, an image of the object, a distance of the object from the sensing component, a density of the object, a motion of the object, etc., can all be determined based on comparing a frequency and/or phase of the interference signal with a frequency and/or phase of the acoustic signal. Moreover, results generated can be further analyzed or presented to a user via a display device (not shown).

Figure 4:
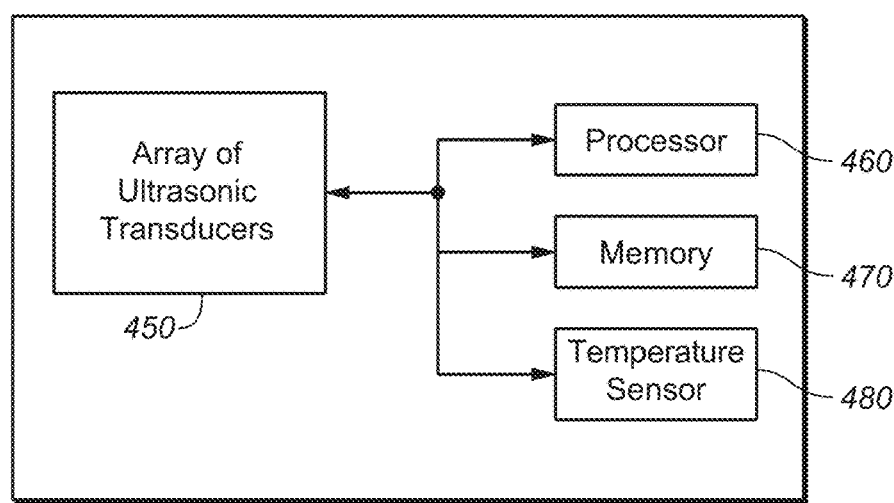
FIG. 4 illustrates an example fingerprint sensor, in accordance with various embodiments.

FIG. 4 illustrates an example fingerprint sensor 415, in accordance with various embodiments. In one embodiment, fingerprint sensor 415 includes an array 450 of ultrasonic transducers (e.g., PMUT devices), a processor 460, and a memory 470. It should be appreciated that some or all operations can be performed a processor external to fingerprint sensor 415 (e.g., a host processor or an application processor) In various embodiments, processor 460 performs certain operations in accordance with instructions stored within memory 470. It should be appreciated that components of fingerprint sensor 415 are examples, and that certain components, such as processor 460 and/or memory 470 may not be located within fingerprint sensor 415.

In one embodiment, fingerprint sensor 415 includes processor 460 for performing the pixel capture, where pixel capture is performed using subsets of ultrasonic transducers (e.g., PMUTs) of fingerprint sensor 415. In some embodiments, pixel capture for groups of pixels is handled the same, such that the groups of pixels utilize same imaging operations (e.g., utilize a same relative activation of the first subset of ultrasonic transducers and the second subset of ultrasonic transducers according to a same local angle). In other embodiments, processor 460 can perform at least some signal analysis, e.g., thresholding, to determine whether an object has interacted with fingerprint sensor 415. In other embodiments, processor 460 can analyze captured pixels and determine whether the object has characteristics of finger, e.g., a pattern resembling the ridge/valley pattern of a fingerprint. In other embodiments, processor 460 can capture an image of the fingerprint and forward it to a processor of system circuitry for further analysis.

In accordance with embodiments, processor 460 is configured to control the activation of the subsets of ultrasonic transducers to generate an ultrasonic signal, also referred to herein as an ultrasonic beam. Using multiple ultrasonic transducers, some of which are time delayed with respect to other ultrasonic transducers, embodiments described herein provide for focusing a transmit beam (e.g., forming a beam) of an ultrasonic signal to a desired point, allowing for high resolution sensing of a fingerprint, or other object. For instance, transmitting an ultrasonic signal from multiple PMUTs, where some PMUTs transmit at a time delay relative to other PMUTs, provides for focusing the ultrasonic beam to a contact point of a fingerprint sensing system (e.g., a top of a platen layer) for sensing a high resolution image of a pixel associated with the transmitting PMUTs. In some embodiments, the activation includes transmitting ultrasonic signals from a first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers, the first group of ultrasonic transducers for forming a focused ultrasonic beam. The activation also includes receiving reflected ultrasonic signals at a second group of ultrasonic transducers of the plurality of ultrasonic transducers While the embodiment of FIG. 4 includes processor 460 and memory 470, as described above, it should be appreciated that various functions of processor 460 and memory 470 may reside in other components of an electronic device. Moreover, it should be appreciated that processor 460 may be any type of processor for performing any portion of the described functionality (e.g., custom digital logic).

In some embodiments, fingerprint sensor also includes temperature sensor 480 which includes circuitry for temperature measurement. In an embodiment, temperature sensor 480 is an integrated silicon thermistor that can be incorporated in the manufacturing process with array 450. In another embodiment, temperature sensor 480 is a MEMS structure different from array 450 but compatible with the manufacturing process for PMUT array 450. In another embodiment, temperature sensor 480 is comprised within a CMOS control layer of the array 450. It should be appreciated that temperature sensor 480 may be any other type of sensor for determining a temperature of ultrasonic sensor 415.

Example Ultrasonic Sensor Having a Contact Layer of Non-Uniform Thickness

Fingerprint sensors are used in electronic devices for user authentication, such as mobile electronic devices, building locks, automobile locks, etc. In many situations, the surface area of the fingerprint sensor needs to be as flat and as uniform as possible in order to obtain a good fingerprint. However, in some situation it may be desirable to have a non-flat or non-uniform fingerprint surface. For example, when a fingerprint sensor is mounted on the back of a mobile phone, a concave form or structured surface may help guide the user's finger to the correct position on the FP sensor. In other situations, the design employs a non-flat form factor, such as a convex button, a rounded door knob or automobile handle. Some designs may require a smooth surface, while other designs may require a rough or textured surface. In further situations, the fingerprint sensor may be integrated in a wearable device, e.g., a smart watch, either on the face of the watch (e.g., behind the display), or on the side of the body. While in the former placement the surface can be relatively flat, in the latter placement the sensor surface may have a small radius of curvature. In general, the smaller the device, or section of the device, where the sensor is integrated, the smaller the radius of curvature, i.e., the more curved the surface is.

Currently, there are different technologies employed by fingerprint sensors for obtaining a fingerprint, including ultrasonic sensing, capacitive sensing, and optical sensing. For instance, for capacitive sensing and optical sensing to perform properly, the sensing layer must be parallel with the contact layer. Otherwise, the signals received may be distorted in a way that precludes proper imaging. In particular, for a capacitive or optical fingerprint sensor to image through a layer of, the capacitive or optical fingerprint sensor would be required to be specially manufactured to conform to the non-uniform surface. However, the tailored manufacture of fingerprint sensors is a costly endeavor, impacting the adoption of such tailored fingerprint sensors within commodity devices.

Embodiments described herein provide an ultrasonic fingerprint sensor comprising a substantially flat two-dimensional array of ultrasonic transducers and a contact layer of non-uniform thickness overlying the two-dimensional array, where the imaging operation is performed through the contact layer of non-uniform thickness. As used herein, the term "substantially" means mostly, primarily, or completely. In particular, the ultrasonic sensor described herein can operate using a two-dimensional array of ultrasonic transducers that is capable of sensing through a contact layer of uniform or non-uniform thickness without having to modify the two-dimensional array of ultrasonic transducers. Embodiments provided herein control the operating parameters of the ultrasonic fingerprint sensor to correct for the non-uniform thickness of the contact layer, generating an image. Although embodiments are described with respect to an array of ultrasonic transducers, the methods and techniques may be applied to other ultrasound sensing architectures where the control of the operating parameters of different segments of the sensors can be adjusted separately to correct for the non-uniform thickness of the contact layer. As utilized herein, a contact layer of non-uniform thickness is non-uniform with respect to the shape (e.g., non-flat) of at least a portion of the contact layer.

Figure 5A:
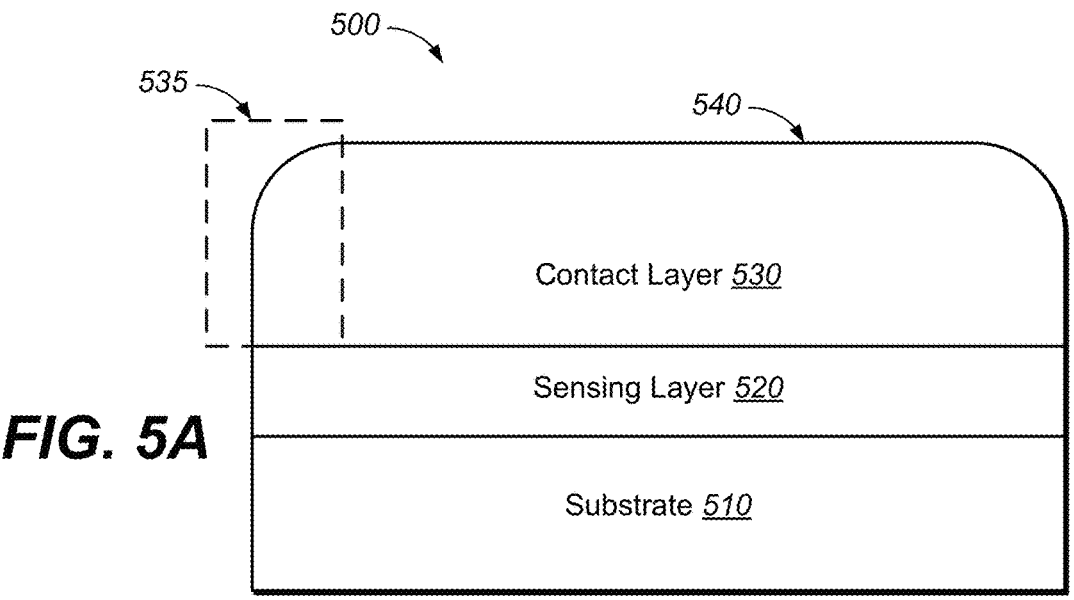
FIGS. 5A, 5B, and 5C illustrates cross section views of ultrasonic fingerprint sensors having contact layers of varying thicknesses, according to an embodiment.

FIG. 5A illustrates a cross section view of an ultrasonic fingerprint sensor 500, according to an embodiment. As illustrated, ultrasonic fingerprint sensor 500 includes several different layers. Ultrasonic fingerprint sensor 500 includes an active sensing layer 520 on top of a substrate 510. The active sensing layer 520 may use various techniques to sense or detect the fingerprint, e.g., acoustic or ultrasonic techniques. It should be appreciated that active sensing layer 520 may not extend to the edges of contact layer 530. For an ultrasonic fingerprint sensor, the sensing layer may comprise an array of ultrasonic transducers (e.g., PMUTs 100 of FIG. 1A, PMUTs 100' of FIG. 1B, or bulk piezo actuator elements) that may be used emit and detect ultrasonic waves. Contact layer 530 overlays sensing layer 520, where the outer surface of contact layer 530 is contact surface 540. Contact surface 540 of contact layer 530 is rounded at edge regions (as indicated by box 535), and is substantially flat and parallel to sensing layer in the interior region. For example, a user using ultrasonic fingerprint sensor 500 places his or her finger in contact with contact surface 540.

In some embodiments, an acoustic coupling layer, and/or other layers such as display devices, (not shown) may be used between sensing layer 520 and contact layer 530 onto which the user puts his or her finger. It should be appreciated that in some embodiments, contact layer 530 and the acoustic coupling layer are a single layer. It should be further appreciated that ultrasonic fingerprint sensor 500 may include other layers, such as bonding layers and laminate layers, and is not intended to be limited to the specific layers shown. In other embodiments, an ultrasonic fingerprint sensor including separate signal transmission and signal detection layers may be used (e.g., within sensing layer 520).

In an ultrasonic fingerprint sensor 500, the acoustic waves travel from the sensing layer 520 through contact layer 530 to contact surface 540, interact with the object on the surface (e.g., a finger), and may then be reflected back to the sensing layer 520, thereby again traversing the contact layer 530. The time from the emission of the waves to the detection of the waves is the time-of-flight (ToF) and depends on the acoustic properties and thicknesses of the contact layer and/or acoustic coupling layer. Due to the varying thickness of contact layer 530 at the edge regions of contact layer 530 (indicated by box 535), ultrasonic beams sent from different locations at sensing layer 520 would result in ToF variations. The ToF variations result in interference patterns, as will be describe below in accordance with FIGS. 6A through 6C. In some embodiments, in order to select the signal of interest, e.g., the signal from waves directly reflected from the object on the surface, a measurement window is used. The activation of the measurement window can be dependent on the ToF, and can vary based on location within sensing layer 520.

Figure 5B:
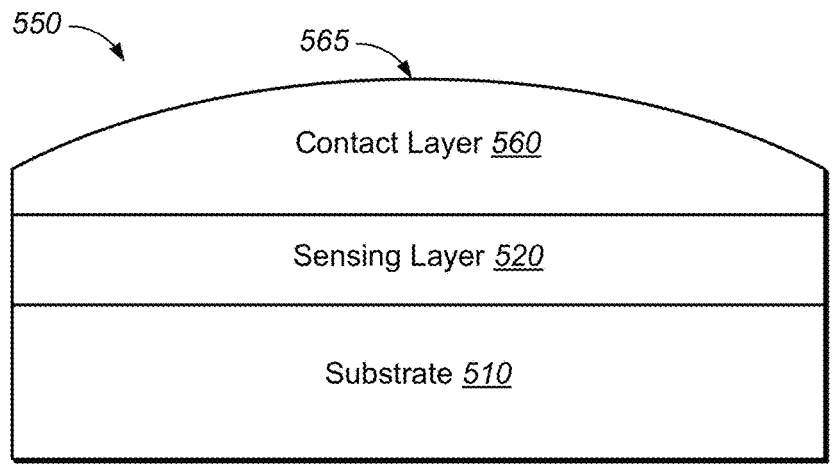

FIG. 5B illustrates a cross section view of an ultrasonic fingerprint sensor 550, according to another embodiment. Ultrasonic fingerprint sensor 550 operates in a similar manner to, and includes the components of, ultrasonic fingerprint sensor 500 of FIG. 5A, with the exception of the shape of contact layer 560. As illustrated, contact layer 560 has a convex profile, such that contact surface 565 is not flat. While one point or small region of contact surface 565 may be parallel to sensing layer 520 (e.g., the mid-point or peak of the convex shape), contact surface 565 is substantially non-flat and non-parallel to substantially flat sensing layer 520.

Due to the varying thickness of contact layer 560, ultrasonic beams sent from different locations at sensing layer 520 would result in ToF variations, as the path traversed by the ultrasonic beams would vary across the contact layer. In some embodiments, in order to select the signal of interest, e.g., the signal from waves directly reflected from the object on the surface, a measurement window is used.

Figure 5C:
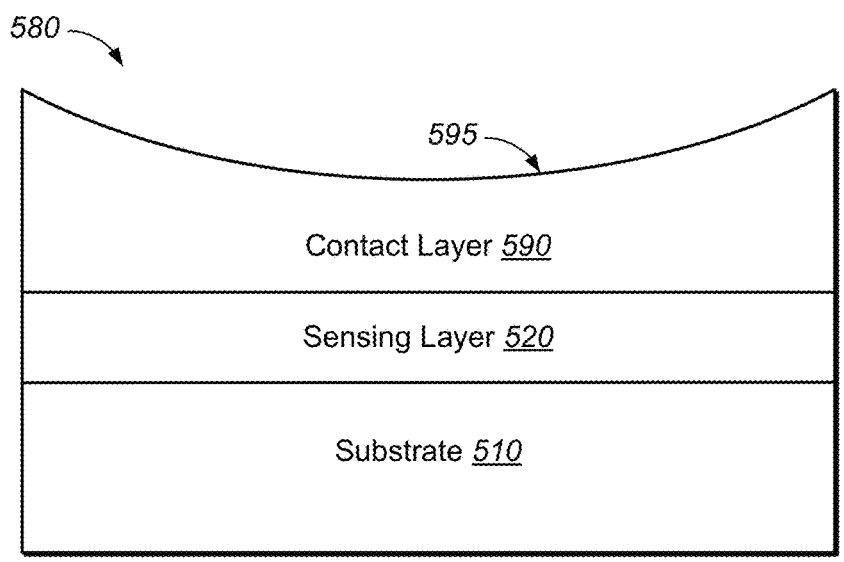

FIG. 5C illustrates a cross section view of an ultrasonic fingerprint sensor 580, according to another embodiment. Ultrasonic fingerprint sensor 580 operates in a similar manner to, and includes the components of, ultrasonic fingerprint sensor 500 of FIG. 5A, with the exception of the shape of contact layer 590. As illustrated, contact layer 590 has a concave profile, such that contact surface 595 is not flat. While one point or small region of contact surface 595 may be parallel to sensing layer 520 (e.g., the mid-point or valley of the concave shape), contact surface 595 is substantially non-flat and non-parallel to substantially flat sensing layer 520.

Due to the varying thickness of contact layer 590, ultrasonic beams sent from different locations at sensing layer 520 would result in ToF variations, as the path traversed by the ultrasonic beams would vary across the contact layer. In some embodiments, in order to select the signal of interest, e.g., the signal from waves directly reflected from the object on the surface, a measurement window is used.

In an example adaptive ToF method, first the optimal ToF to obtain the desired performance is determined for different ultrasonic transducers or different sections of the sensor. Next, a ToF map, ToF listing, or ToF index is created which links the optimum TOF to the different transducers and or segments of the sensor. The TOF map, listing, or index is then used to control the measurement window setting for the different transducers/pixels. The linking may be based on the location of the transducers. For example, a ToF map can be created, where groups of transducers having ToF values within a range are created, allowing for grouped control of the measurement windows for each group. When the ToF information is used to control the measurement window, in general the timing of the transmission of the ultrasonic waves from the different transducers or different section is not adapted. In other embodiments, instead of controlling the measurement window, the transmission timing of the ultrasonic waves may be adapted to correct for the non-uniform contact surface.

Once the ToF has been determined and stored, it may be applied to determine the correct operational settings of the measurement windows for the respective subsets of transducers. Regular updates of the ToF map may be performed to make sure the optimum ToF is always available. The update may be regularly in time, or may be triggered by certain events or operational conditions, such as e.g., high motion or acceleration, mechanical shock, (fast) temperature change, extreme temperatures, etc.

In some embodiments, each ultrasonic transducer or group of ultrasonic transducers may be controlled using a determined optimum ToF, where the measurement window is shifted in time according to the optimum ToF. The width of the measurement window may be adapted to the received signal and the variation in the ToF over the selected transducers. The larger the number of transducers that are combined, the higher the possibility that there is a variation of the ToF, and therefore the wider/longer the size of the integration window. A distribution of the optimum ToF values may be determined, and the applied setting may be chosen to comprise a predefined portion or percentage of the distribution. In one embodiment, only a single measurement window size is used, and the ToF investigation is used to determine what the variation in ToF across the sensor surface is, and then the window size is adapted accordingly to capture the desired signal or depending on the ToF distribution.

In some architectures, the measurement window may not be changeable or adaptable for individual transducers, and therefore in some embodiments the measurement window may be divided in a number of sub-windows each having a certain ToF range. Then, based on the optimum ToF for a certain transducer or set of transducers, one or more of the sub-windows are selected corresponding to the optimal ToF. For example, in some architectures, where control of the transducers is collective, in order to capture signals for the entire array of the ultrasonic sensor, the measurement window must be big enough to capture signals over the entire ToF range. In other architectures, where transducers are controllable at a more granular level (e.g., grouped control or individual control), the measurement windows for groups of transducers or individual transducers can be tuned according to the ToF range for the groups of transducers or individual transducers. It should be appreciated that there is a tradeoff between the granular control of transducers and the number of distinct measurement windows. For instance, granular control provides higher quality measurement of received signals, but requires more complicated control mechanisms (e.g., driving circuit, routing, etc.) and might result in higher power consumption. Moreover, it should be appreciated that an ultrasonic fingerprint sensor capable of granular control of transducers utilize the granular control during operations requiring high degrees of precision, while using collective control of the transducers during operations that do not require high degrees of precision.

In the discussion above, the measurements window is varied to correct for the difference in time-of-flight. In alternative embodiments, the measurement window may be constant but the transmission timing may be adapted for the different pixels, so that even with a different ToF, the signal of interest still is measured within the static measurement window. In some embodiments, the transmission timing and the measurement window are both adapted to correct for the differences in ToF. In such embodiments, the ToF map is used to control the transmission of signals from different groups of transducers or individual transducers, such that signals might be transmitted at different times, but are received within a constant measurement window.

The various embodiments described herein may be applied to an ultrasonic fingerprint sensor, where the contact layer is non-uniform. The surface may need to have a certain amount of roughness or variation in depth or thickness, before advantages of the techniques disclosure here become of significant importance. For many applications, if the depth/thickness variations are very small, for example, only a few micrometers, the advantage of applying these techniques may be minor. However, in some applications where high precision is required (e.g. banking applications, high security application, etc.), even the small depth/angle variations are of importance. For example, operation of the ultrasonic fingerprint sensor can be adaptive and use a higher precision mode (e.g., more granular control of transducers) when high precision is required, and use a lower precision mode (e.g., collective control of transducers) during normal operation. The application of the high precision mode may also depend on the available resources and may not be applied when few power and/or computation resources are available.

In devices where the device is designed such that the user can feel where the fingerprint sensor is positioned, a certain depth, thickness, or angle variation is required so that the user can actually feel the fingerprint sensor. In these use cases, the depth, thickness, or angle variation is generally more than 100 micrometers, and often more than 200-300 micrometers. These depth, thickness, or angle variations typically benefit from the application of the described embodiments in order to improve the performance of the ultrasonic fingerprint sensor. The discussion of depth, thickness, and angle variations relates to the distance between the non-flat surface of the contact layer and the generally flat surface of the sensing layer or substrate layer, as shown in the figures. If the ultrasonic fingerprint sensor and the contact surface are not parallel, the described embodiments can be used to correct for the ToF differences.

Figure 6A:
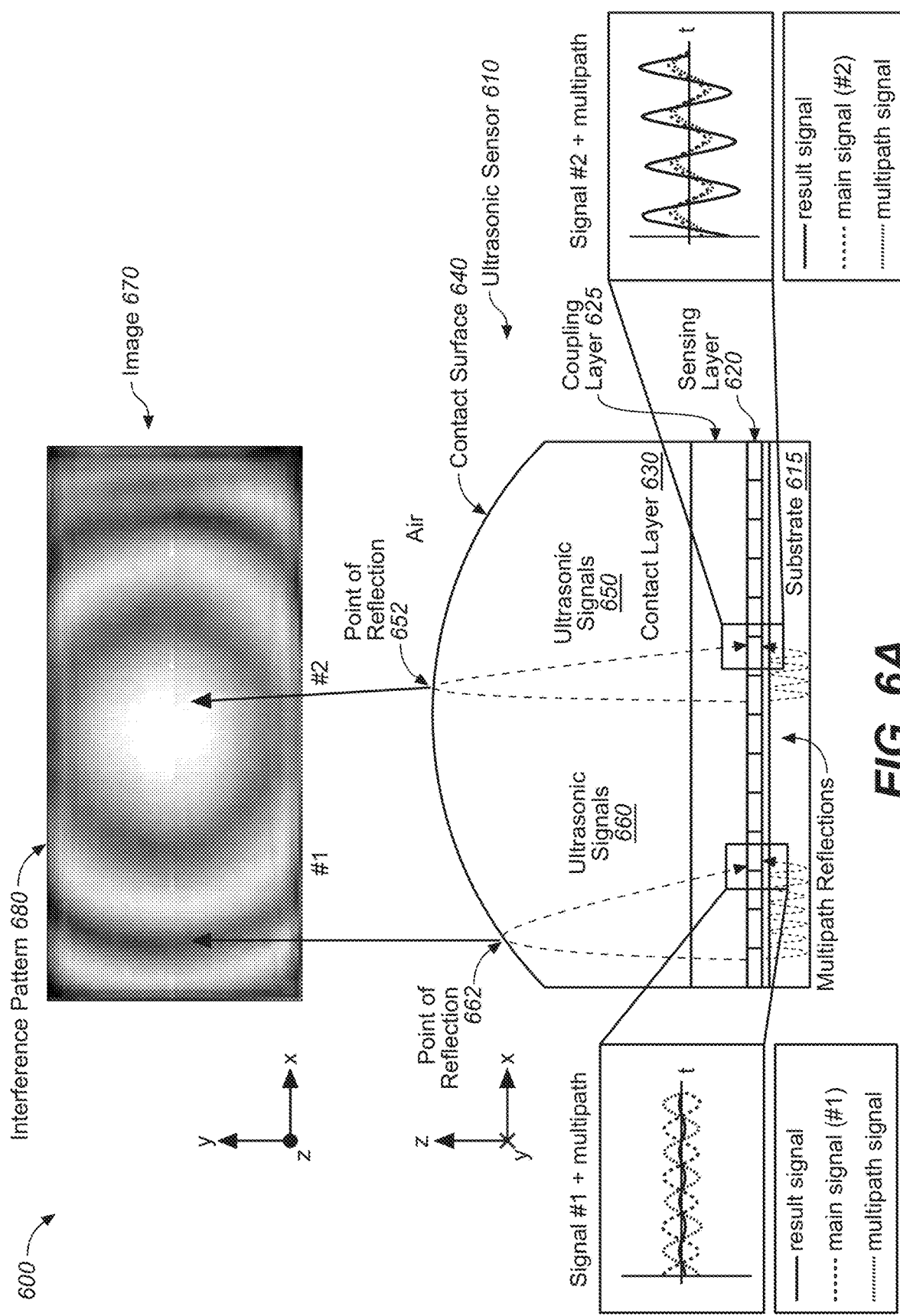
FIG. 6A illustrates an example of interference pattern generation during image capture at an ultrasonic fingerprint sensor having a contact layer of varying thicknesses, according to an embodiment.

FIG. 6A illustrates an example 600 of interference pattern 680 generation during image capture at an ultrasonic sensor 610 having a contact layer 630 of varying thicknesses, according to an embodiment. Ultrasonic sensor 610 operates in a similar manner to, and includes the components of, ultrasonic fingerprint sensor 550 of FIG. 5B. As illustrated, ultrasonic sensor 610 includes substrate 615, sensing layer 620, acoustic coupling layer 625, and contact layer 630 having contact surface 640. During a pixel imaging operation, ultrasonic signals 650 and 660 are generated at sensing layer 620 (e.g., generated using multiple ultrasonic transducers) and transmitted toward to contact surface 640 (e.g., at an angle perpendicular to sensing layer 620). Ultrasonic signals 650 and 660 travel through acoustic coupling layer 625 and contact layer 630 to points of reflection 652 and 662, respectively, on contact surface 640, where at least a portion of ultrasonic signals 650 and 660 reflects off contact surface 640 and are directed back toward sensing layer 620. It should be appreciated that ultrasonic signals 650 and 660 are focused at contact surface 640. Depending on the distance between sensing layer 620 and contact surface 640, different beamforming patterns may be used for transmitting that ultrasonic signals 650 and 660 at the same frequency, as the focal point for a beamforming pattern can be impacted by frequency.

As illustrated in FIG. 6A, ultrasonic signals 650 and 660 are generated at different locations on sensing layer 620 and at a constant frequency, and travel through portions of contact layer 630 having different thicknesses. As a result, the ToF of ultrasonic signals 650 and 660 are different, due to the varying path length through contact layer 630. Moreover, the ToF variations result in the generation of an interference pattern 680 within the captured image 670. Interference pattern 680 is the result of wavelength of the transmitted ultrasonic signals relative to the distance traveled within contact layer 630. Because the path length of the return wave is dependent on point of reflection on contact surface 640, the constructive or destructive interference of return waves with multipath waves will introduce "band" patterns in the image. For instance, multipath waves from substrate 615 and multi-layer reflections will interfere in constructive or destructive patterns depending on the local thickness of contact layer 630, as the phase of the multipath signal will be constant but the phase of the reflected wave from contact layer 630 will depend on the wavelength in material and the relative thickness of contact layer 630 at the path of transmission and reflection. In the extreme cases, the two signals will be 0 degrees in-phase (e.g., constructive interference generating maximum signal) or 180 degrees out-of-phase (destructive interference generating minimum signal. It should be appreciated that embodiments described herein can be applied when any layer has thickness variation on the order of magnitude of acoustic wavelength in that material, and is not limited to the thickness variation of contact layer 630.

For example, as illustrated, ultrasonic signal 650 is generated at such a position and frequency that the incident wave (e.g., transmitted ultrasonic beam) and the reflected wave (e.g., received ultrasonic beam) are in phase and result in constructive interference (e.g., resultant wave) that amplifies the received signal strength of ultrasonic signal 650. Ultrasonic signal 660 is generated at such a position and frequency that the incident wave (e.g., transmitted ultrasonic beam) and the reflected wave (e.g., received ultrasonic beam) are out of phase and result in destructive interference (e.g., resultant wave) that weakens the received signal strength of ultrasonic signal 660. As image capture is performed across ultrasonic sensor 610, interference pattern 680 is generated within image 670, where interference pattern 680 of image 670 illustrates an example of the varying signal strength intensity across image 670. Interference pattern 680 can be dominant over the underlying captured fingerprint (e.g., fingerprint ridge/valley features), thereby obfuscating or otherwise impacting fingerprint quality of the underlying captured fingerprint. It should be appreciated that interference pattern 680 will vary with respect to the transmission frequency of ultrasonic signals 650 and 660, in that the locations of constructive and destructive interference will vary, but that image 670, regardless of frequency, will include an interference pattern 680 (e.g., as long as the thickness variation is greater than the acoustic wavelength in the contact layer material). The interference pattern also depends on the acoustic characteristics of contact layer 630, such as the speed of sound in the material of contact layer 630. Furthermore, the acoustic characteristics may depend on external factors such as e.g. temperature. As a consequence, interference pattern 680 may also vary with temperature.

Figure 6B:
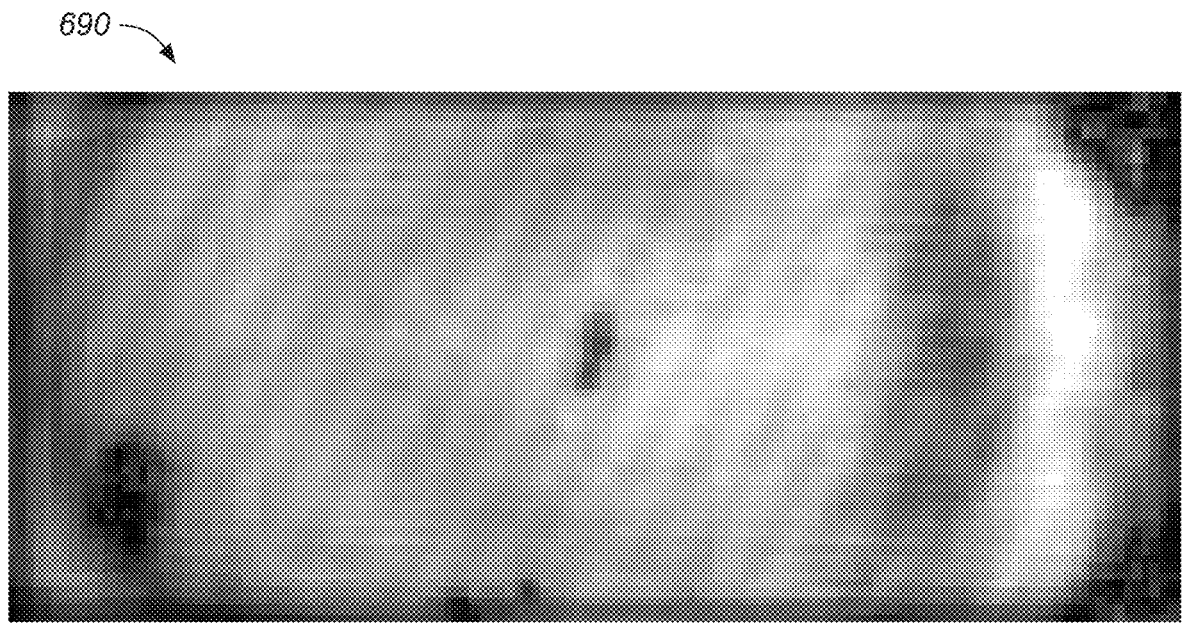
FIG. 6B illustrates an example interference pattern generated using one pulse of ultrasonic signals by an ultrasonic fingerprint sensor having a contact layer of varying thicknesses, according to an embodiment.
Figure 6C:
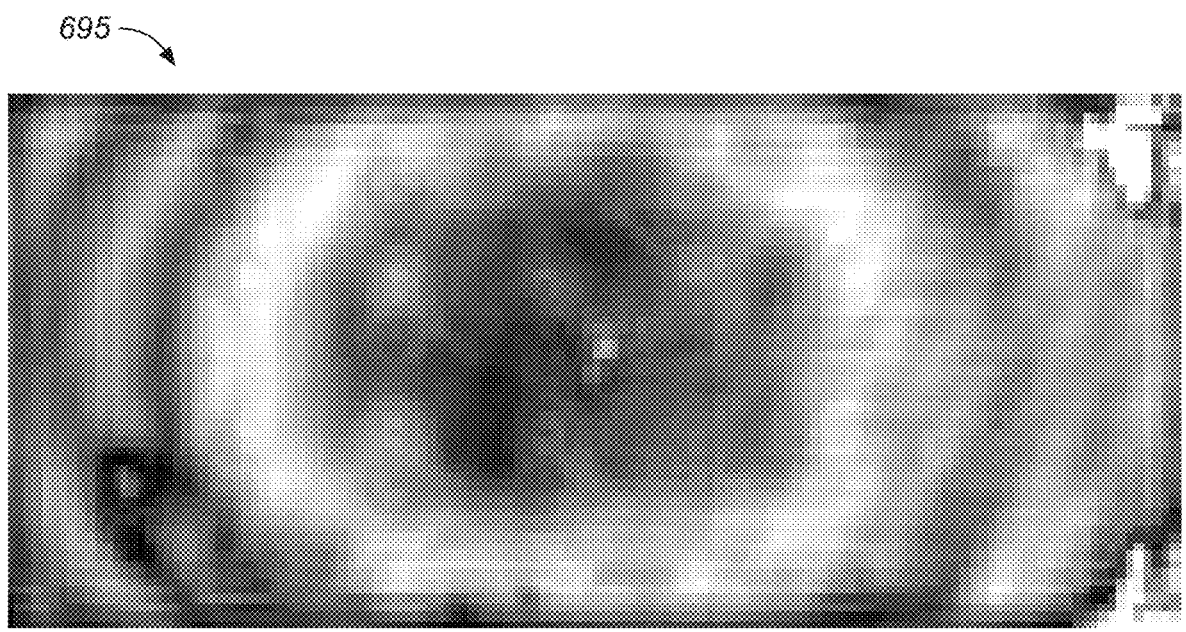
FIG. 6C illustrates an example interference pattern generated using three pulses of ultrasonic signals by an ultrasonic fingerprint sensor having a contact layer of varying thicknesses, according to an embodiment.

FIG. 6B illustrates an example fingerprint image 690 including an interference pattern generated using one pulse of ultrasonic signals by an ultrasonic fingerprint sensor having a contact layer of varying thicknesses, according to an embodiment. As used herein, a "pulse" refers to a single period for the drive signal resulting in one wavelength of pressure variation in the material at a given time. FIG. 6C illustrates an example fingerprint image 695 including an interference pattern generated using three pulses of ultrasonic signals by an ultrasonic fingerprint sensor having a contact layer of varying thicknesses, according to an embodiment. As illustrated, the interference patterns can be dominant over the underlying image captured, reducing the quality of the underlying fingerprint image, e.g., reducing the fingerprint image's effectiveness for fingerprint authentication. FIGS. 6B and 6C illustrate that the interference pattern also varies according to the number of pulses of ultrasonic signals used to generate the respective fingerprint images 690 and 695. Therefore, the system may adapt the number of pulses to control interference pattern 680. It should be appreciated that changing the number of pulses is a tradeoff between interference level and acoustic energy. For example, increasing the number of pulses will increase the signal while also increasing interference.

Embodiments described herein provide a sensor device including a two-dimensional array of ultrasonic transducers, wherein the two-dimensional array of ultrasonic transducers is substantially flat, and a contact layer having a non-uniform thickness overlying the two-dimensional array of ultrasonic transducers, and methods for using such a device, to account for an interference pattern of a captured image caused by the non-uniform thickness of the contact layer. An imaging operation at an ultrasonic sensor is performed, where a transmission frequency of the activated ultrasonic transducers is controlled during the imaging operation. A plurality of transmission frequencies is used during the imaging operation to account for an impact of an interference pattern caused by the non-uniform thickness of the contact layer.

In one embodiment, a plurality of images is captured using a plurality of transmission frequencies, where images of the plurality of images are captured at different transmission frequencies. The plurality of images captured is combined into a single output image, wherein the single output image reduces the impact of the interference pattern caused by the non-uniform thickness of the contact layer. It should be appreciated that changing the transmission frequency may also result in changing the ToF and beamforming pattern as well, as these settings are dependent on local thickness to focus a point of reflection on contact surface.

Figure 7:
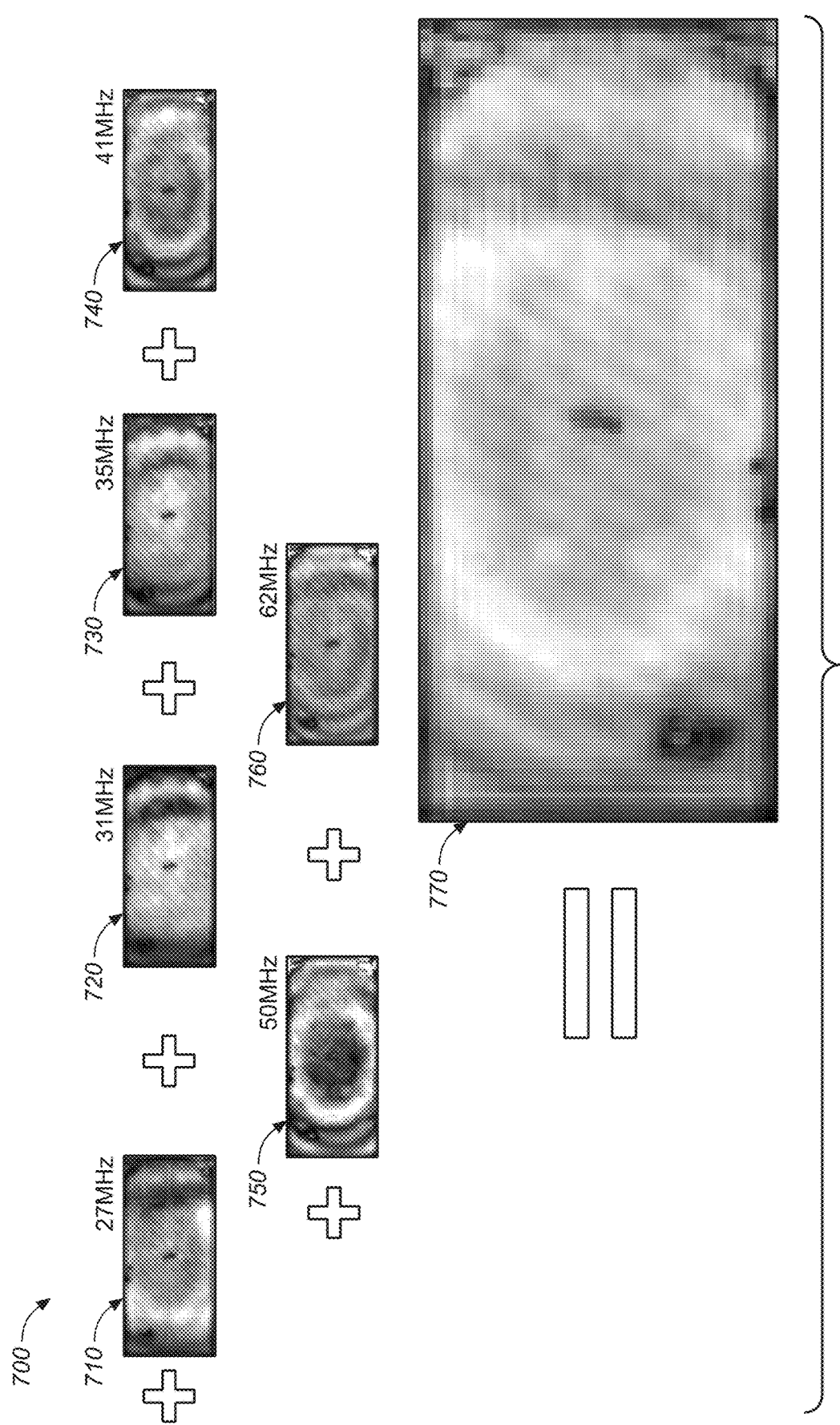
FIG. 7 illustrates an example of combining multiple images captured using different frequencies by an ultrasonic fingerprint sensor to account for the impact of an interference pattern caused by the non-uniform thickness of a contact layer of the ultrasonic fingerprint sensor, according to an embodiment.

FIG. 7 illustrates an example 700 of combining multiple images captured using different frequencies by an ultrasonic fingerprint sensor to account for the impact of an interference pattern caused by the non-uniform thickness of a contact layer of the ultrasonic fingerprint sensor, according to an embodiment. An ultrasonic sensor having a contact layer of non-uniform thickness, captures a plurality of fingerprint images 710, 720, 730, 740, 750, and 760, where each fingerprint image is captured using a different transmission frequency. As illustrated, fingerprint image 710 is captured using a transmission frequency of 27 megahertz (MHz), fingerprint image 720 is captured using a transmission frequency of 31 MHz, fingerprint image 730 is captured using a transmission frequency of 35 MHz, fingerprint image 740 is captured using a transmission frequency of 41 MHz, fingerprint image 750 is captured using a transmission frequency of 50 MHz, and fingerprint image 760 is captured using a transmission frequency of 62 MHz. The different images at different frequencies are captures at rapid succession, during a single fingerprint press of the user. As discussed above, in some embodiments, this process may only be used during a high precision mode, and may require the user to press a little longer than when not in the high precision mode.

It should be appreciated that the combination of multiple images captured at different transmission frequencies can use any number of fingerprint images captured at different transmission frequencies, and that any transmission frequency can be used, and is not limited to the illustrated embodiment. It should be appreciated that the number of images and frequencies used can be design specific, and based on the actual non-uniform thickness of the contact layer of the ultrasonic sensor, and can be experimentally determined (e.g., during design and/or calibration). Furthermore, the number of images and frequencies used may also depend on the required accuracy or the permitted latency of the capturing process (which may depends on the application). The frequencies are selected to provide an optimum correction of the interference pattern. The (number of) frequencies may be determined in calibration process. The sensor may run a calibration procedure to verify a plurality of frequency combinations and quantify the correction quality. The calibration procedure may be done when no finger is present on the sensor.

As illustrated, fingerprint images 710, 720, 730, 740, 750, and 760 are combined to reduce, minimize, or cancel out the impact of the interference pattern caused by the non-uniform thickness of the contact layer. In one embodiment, fingerprint images 710, 720, 730, 740, 750, and 760 are combined by averaging fingerprint images 710, 720, 730, 740, 750, and 760 into a single output image. In the averaging, different weights may be applied to different images to account for differences in signal level and background level. In another embodiment, fingerprint images 710, 720, 730, 740, 750, and 760 are combined using convolution of fingerprint images 710, 720, 730, 740, 750, and 760 to generate a single output image. In some embodiments, only portions of images 710, 720, 730, 740, 750, and 760 exhibiting interference (e.g., above an interference threshold) are combined.

In one embodiment, a plurality of portions of an image is captured using the plurality of transmission frequencies, where some portions are captured at different transmission frequencies. The transmission frequencies of the portions are selected based on the thickness of contact layer 630 associated with the portions and the acoustic properties of the contact layer material, such as speed of sound. The plurality of portions captured is combined into a single output image, wherein the single output image reduces the impact of the interference pattern caused by the non-uniform thickness of the contact layer. It should be appreciated that each portion may have ToF and beamforming settings corresponding to the transmission frequency of the portion.

Figure 8:
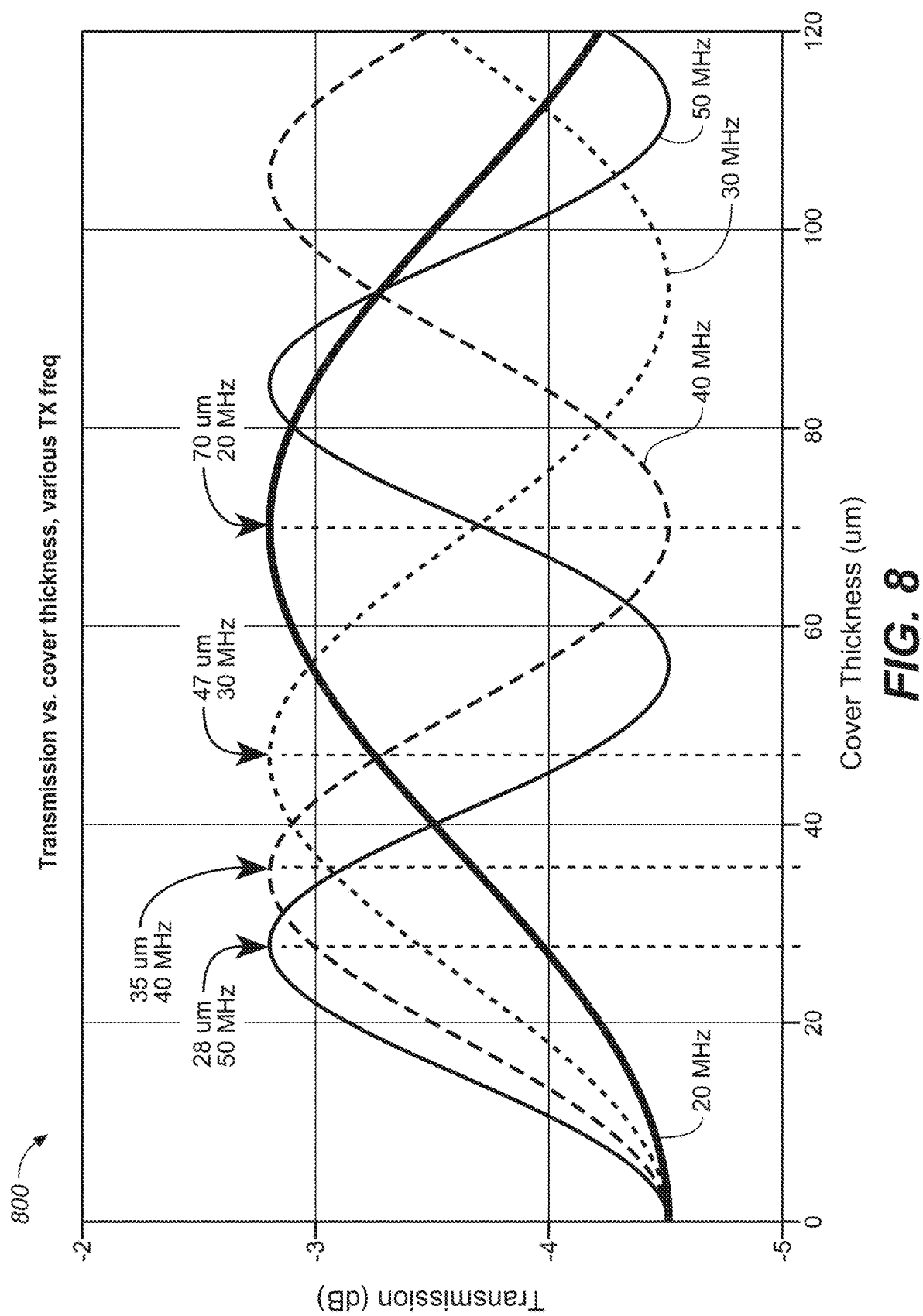
FIG. 8 illustrates an example graph of transmission versus contact layer thickness of an ultrasonic fingerprint sensor for different frequencies, according to embodiments.

FIG. 8 illustrates an example graph 800 of transmission versus contact layer thickness of an ultrasonic fingerprint sensor for different frequencies, according to embodiments. Graph 800 illustrates that for different contact layer thicknesses, different transmission frequencies result in constructive or destructive interference. For example, at a transmission frequency of 40 MHz, a contact layer thickness of approximately 35 micrometers (μm) results in maximal constructive interference as indicated by the peak transmission signal. Similarly, at 20 MHz, a contact layer thickness of approximately 70 μm results in maximal constructive interference as indicated by the peak transmission signal. However, a contact layer thickness of approximately 70 μm results in maximal destructive interference for a transmission frequency of 40 MHz, as indicated by the minimum transmission signal.

Graph 800 illustrates that the maximum and minimum signal strength varies according to frequency and contact layer thickness. Using this information, an ultrasonic sensor can be controlled to capture different portions of an image using different transmission frequencies, and then combined into a single output image that accounts for the interference caused by the non-uniform thickness of the contact layer. It should be appreciated that this relationship may vary based on design of an ultrasonic sensor, and can be experimentally determined (e.g., during design and/or calibration). The number of frequencies and image portions used may also depend on the required accuracy and precision-mode the sensor is operating in. Furthermore, number of frequencies and image portions, and size of image portions, may also depends on the change of thickness. A calibration procedure may be run to determine which frequencies to use for which portions of the images, and which pixels are contained within the different portions. The calibration process may comprise capturing signals at different frequencies for different pixels or groups of pixels, and based on analyzing the captured signals, determine the appropriate frequencies and pixels groupings. The calibration process may be assisted by data providing information about the shape and form of the contact surface, such as e.g. a thickness map/model of the contact surface. The calibration process may also include developing a model for the shape and form of the contact surface using the ToF information of each pixel, collected by using a minimal interference drive scheme (e.g. small number of pulses and/or low frequency).

Figure 9A:
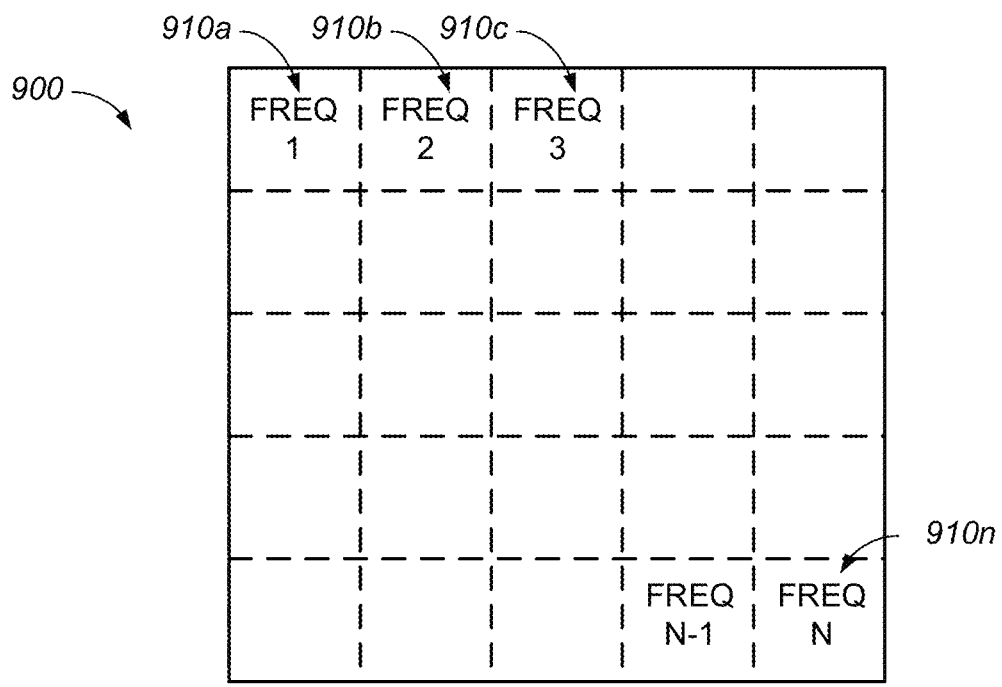
FIGS. 9A and 9B illustrate examples of frequency grouping maps for use by an ultrasonic fingerprint sensor, according to embodiments.
Figure 9B:
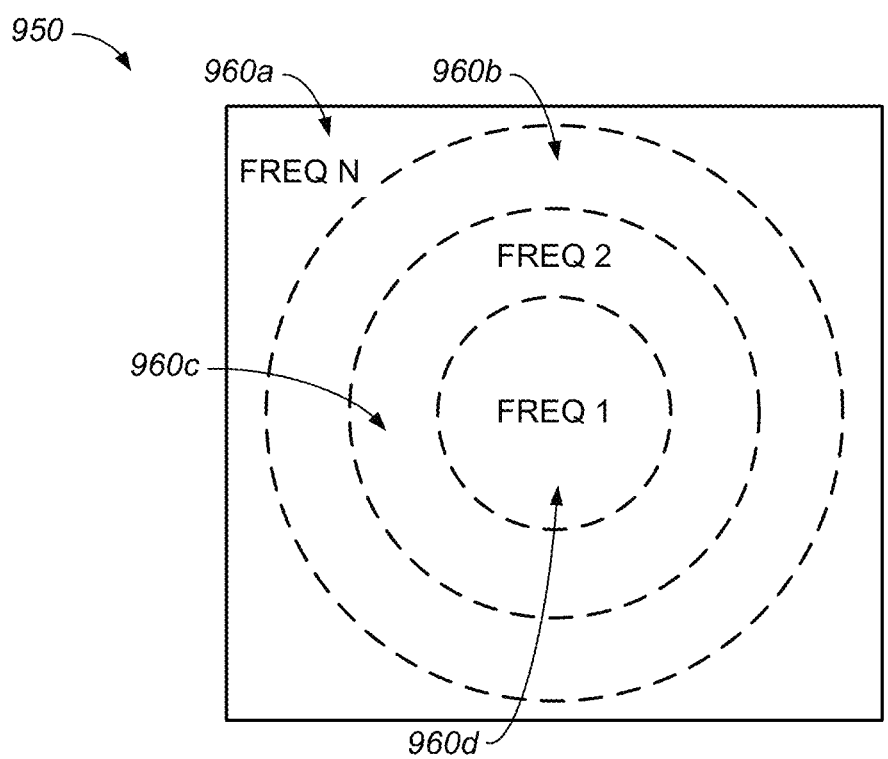

FIGS. 9A and 9B illustrate examples of frequency grouping maps for use by an ultrasonic fingerprint sensor, according to embodiments. Using the relationship between transmission frequency contact layer thickness, pixel grouping maps 900 and 950 can be used to control the transmission frequency used for each group. It should be appreciated that a pixel group includes one or more constituent pixels. In some embodiments, a frequency for a particular pixel group is selected according to the corresponding contact layer thickness for the pixel group.

Pixel grouping map 900 includes twenty-five pixel groups (e.g., pixel groups 910*a*, 910*b*, 910*c*, and 910*n*), each using a particular transmission frequency during pixel capture. It should be appreciated that some pixel groups can use the same transmission frequency, as some pixel groups may have a same or similar thickness profile of the contact layer. During imaging, different portions of an image are captured using the different transmission frequencies. It should be appreciated that each portion may have ToF and beamforming settings corresponding to the transmission frequency of the portion. The pixels groups may be captured based on the order of the groups, for example, starting with pixel group 910*a*, then 910*b* etc. Alternatively, the pixel groups maybe captures in order of frequency, going from a low frequency to a high frequency, or vice-versa. It should be appreciated that portions can be individually captured or all portions using the same transmission frequency can be captured at the same imaging operation. In other embodiments, entire images may be captured using particular transmission frequencies, and the pertinent pixel groups may be extracted from these images for use in the final output image. The pixel groups of pixels grouping map are then combined into a single output image.

Pixel grouping map 950 includes four pixel groups 960*a*, 960*b*, 960*c*, and 960*d*, each using a particular transmission frequency during pixel capture. For example, pixel grouping map 950 may be used with an ultrasonic sensor having a circular convex or concave contact layer (e.g., ultrasonic fingerprint sensor 550 of FIG. 5B and ultrasonic fingerprint sensor 580 of FIG. 5C). It should be appreciated that some pixel groups can use the same transmission frequency, as some pixel groups may have a same or similar thickness profile of the contact layer. During imaging, different portions of an image are captured using the different transmission frequencies. It should be appreciated that portions can be individually captured or all portions using the same transmission frequency can be captured at the same imaging operation. In other embodiments, entire images may be captured using particular transmission frequencies, and the pertinent pixel groups may be extracted from these images for use in the final output image. The pixel groups of pixels grouping map are then combined into a single output image.

Temperature of an ultrasonic sensor can impact the operation of the ultrasonic sensor, because the temperature affects the acoustic characteristics of contact layer 630 (and other layers). For instance, in one embodiment, a temperature can impact the speed at which an ultrasonic signals traverses the contact layer. In some embodiments, a transmission frequency used by the ultrasonic sensor is varied according to temperature, to generate an image with a constant interference pattern, e.g., an interference pattern that does not change, or changes little, with temperature. Where an interference pattern is constant, an image interference correction can be applied to the resultant image to account for the impact of the interference pattern. The image correction is more accurate, the more stable the interference pattern is.

FIG. 10 illustrates an example of adapting a transmission frequency used for image capture by an ultrasonic fingerprint sensor according to temperature, to obtain a constant wavelength, according to an embodiment. The ultrasonic sensor has a temperature of −10 degrees Celsius during capture of image 1000 and has a temperature of 25 degrees Celsius during capture of image 1010. At −10 degrees Celsius, the material of the contact layer allows for transmission of an ultrasonic signal at 6000 meters per second, while at 25 degrees Celsius, the material of the contact layer allows for transmission of an ultrasonic signal at 5600 meters per second. By using a transmission frequency of 53.5 MHz during the capture of image 1000 and using a transmission frequency of 50 MHz during the capture of image 1010, the resulting wavelengths of the transmitted waves are the same, and an output image with the same interference pattern can be generated. If the acoustic speed of sound of contact layer material is known as a function of temperature, then the correct frequency to obtain the same interference pattern can be calculated for each temperature. This same technique can be applied to any temperature and transmission frequency, allowing for the generation of a constant interference pattern at all output images for the same ultrasonic sensor, regardless of temperature. The temperature may be obtained from a temperature embedded in the sensor or in other parts of the device (e.g., temperature sensor 480). Where a constant interference pattern is generated at all output images, an constant interference pattern correction can be applied to any output image, to account for the impact of the interference pattern on the output image. The image is then corrected for the interference pattern. In some embodiments, a captured fingerprint image is corrected using a previously captured background image when no finger was present on the sensor. This type of background image without a finger present may also be referred to as a darkfield image. The background image or darkfield image may be captured at a first temperature and then stored for use and correction at a later time. If at this later time a fingerprint image is captured at a different second temperature, and the fingerprint image needs to be corrected using the background image captured at the first temperature, the frequency during the fingerprint capture may be adapted to account for the difference between the first and second temperature.

Figure 11:
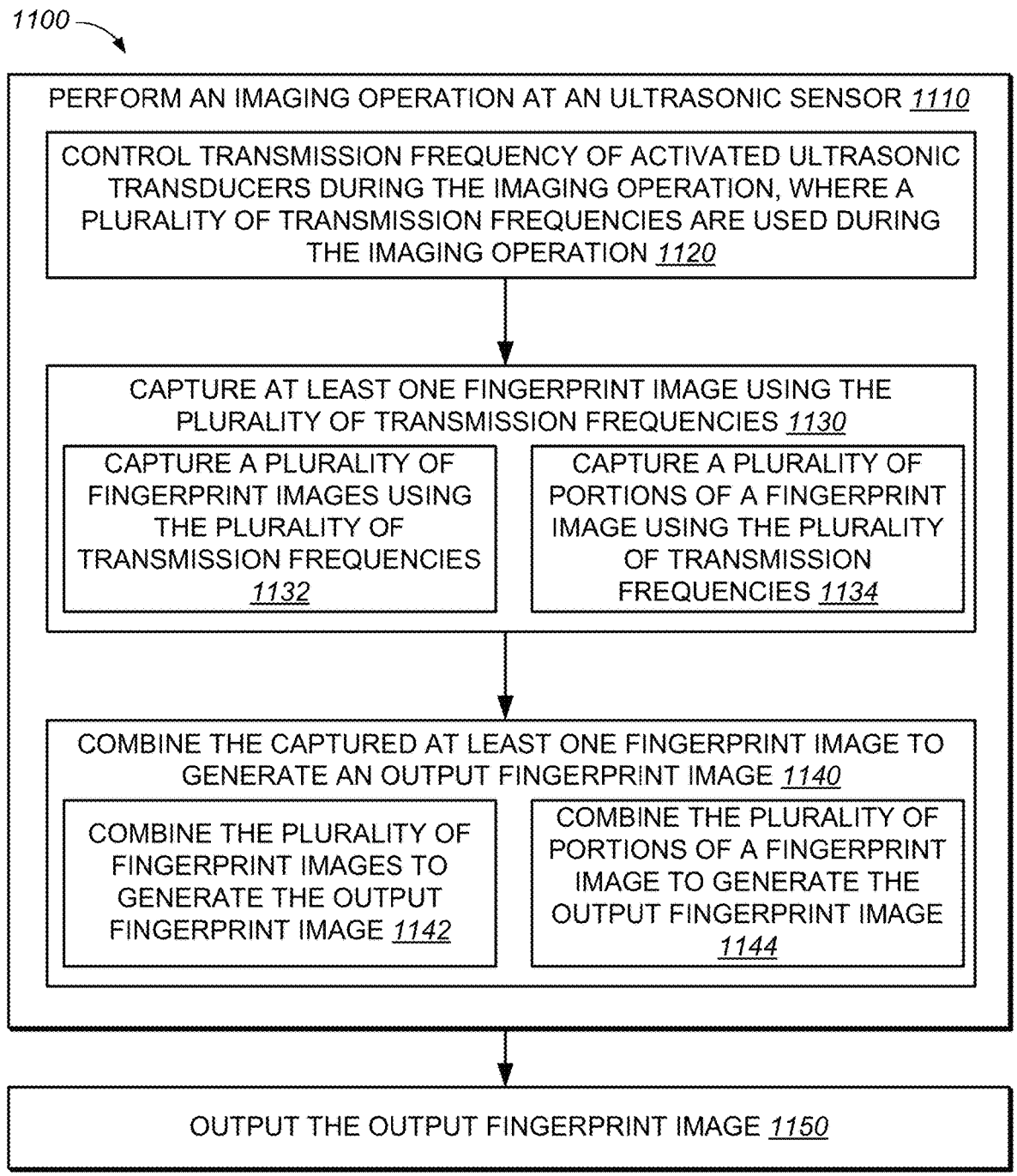
FIG. 11 illustrates a flow diagram of an example method for capturing an image at an ultrasonic sensor using a plurality of transmission frequencies, according to embodiments.
Figure 12:
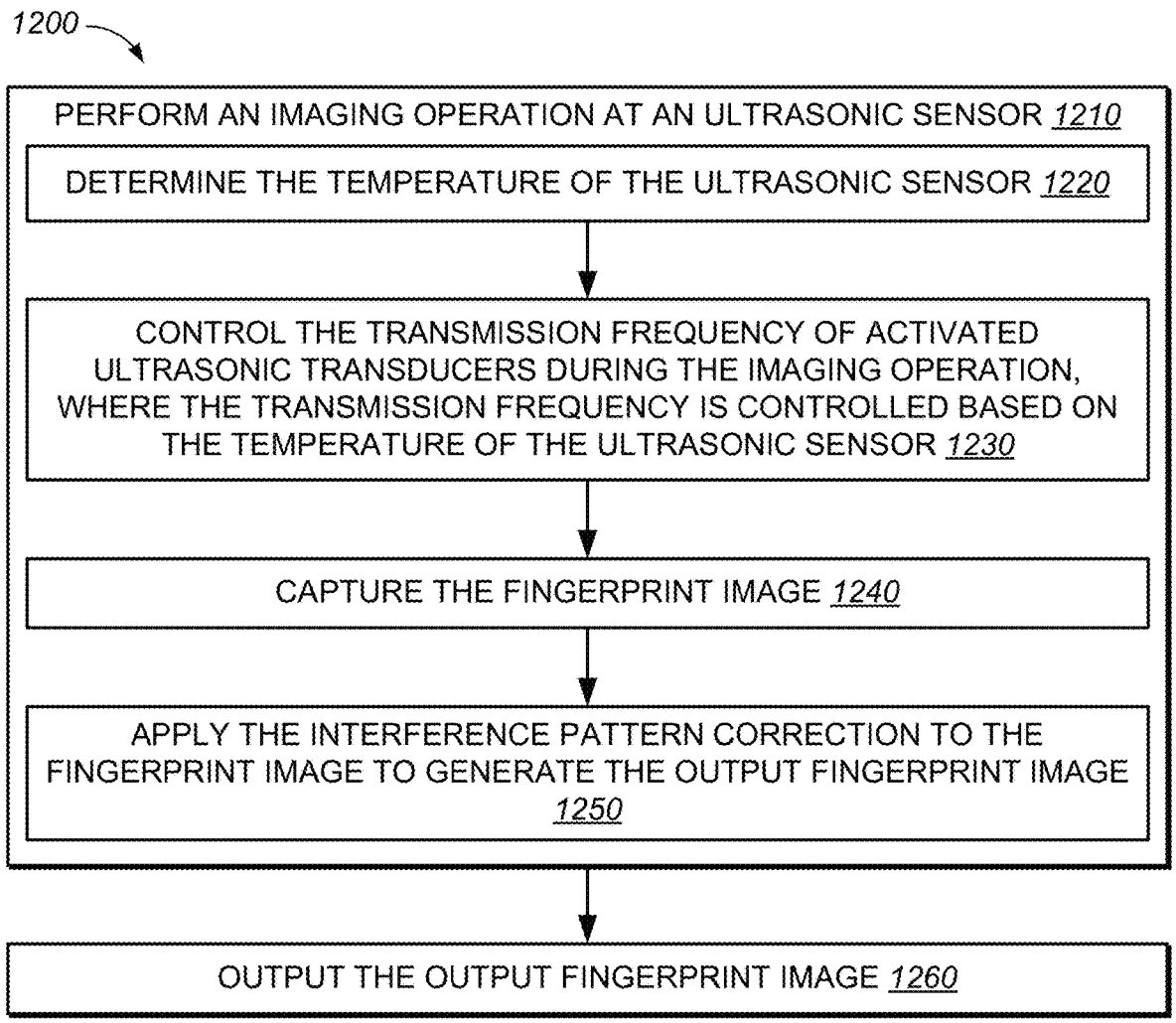
FIG. 12 illustrates a flow diagram of an example method for capturing an image at an ultrasonic sensor using a temperature to control the transmission frequency, according to embodiments.

FIGS. 11 and 12 illustrate flow diagrams of example methods for operating a fingerprint sensor comprised of ultrasonic transducers, according to various embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

FIG. 11 illustrates a flow diagram 1100 of an example method for capturing an image at an ultrasonic sensor using a plurality of transmission frequencies, according to embodiments. At procedure 1110 of flow diagram 1100, an imaging operation is performed at a two-dimensional array of ultrasonic transducers of the ultrasonic sensor to generate a plurality of pixels, wherein the ultrasonic sensor has a contact layer having a non-uniform thickness overlying the two-dimensional array of ultrasonic transducers and wherein the two-dimensional array of ultrasonic transducers is substantially flat. At procedure 1120 of flow diagram 1100, a transmission frequency of activated ultrasonic transducers is controlled during the imaging operation, wherein a plurality of transmission frequencies are used during the imaging operation to account for an impact of an interference pattern caused by the non-uniform thickness of the contact layer.

At procedure 1130, at least one fingerprint image is captured using the plurality of transmission frequencies. In one embodiment, as shown at procedure 1132, a plurality of fingerprint images is captured using the plurality of transmission frequencies. In one embodiment, the plurality of transmission frequencies operate to cancel out the interference pattern of the plurality of fingerprint images. In another embodiment, as shown at procedure 1134, a plurality of portions of a fingerprint image is captured using the plurality of transmission frequencies. In one embodiment, aspects of procedures 1132 and 1134 are both performed, where at least one fingerprint image is captured and at least one portion of a fingerprint image are captured, where at least two transmission frequencies are used.

At procedure 1140, the captured at least one fingerprint image is combined to generate an output fingerprint image. In one embodiment, as shown at procedure 1142, the plurality of fingerprint images (e.g., the plurality of fingerprint images captured at procedure 1132) is combined into a single output fingerprint image, wherein the single output fingerprint image reduces the impact of the interference pattern caused by the non-uniform thickness of the contact layer. In one embodiment, the plurality of fingerprint images is combined into a single output fingerprint image by averaging the plurality of fingerprint images. In another embodiment, the plurality of fingerprint images is combined into a single output fingerprint image by using convolution, which operates to reinforce similar signals (e.g., fingerprint ridges) and cancel out dissimilar signals (e.g., interference).

In another embodiment, as shown at procedure 1144, the plurality of portions of the fingerprint image (e.g., the plurality of portions captured at procedure 1134) is combined into a single output fingerprint image. In one embodiment, the plurality of transmission frequencies provide constructive interference for corresponding portions of the plurality of portions of the fingerprint image during the imaging operation. In one embodiment, the portions of the plurality of portions include a plurality of pixels. In another embodiment, the portions of the plurality of portions include single pixels.

At procedure 1150, the output fingerprint image is output (e.g., for use in fingerprint authentication).

FIG. 12 illustrates a flow diagram 1200 of an example method capturing an image at an ultrasonic sensor using a temperature to control the transmission frequency, according to embodiments. At procedure 1210 of flow diagram 1200, an imaging operation is performed at a two-dimensional array of ultrasonic transducers of the ultrasonic sensor to generate a plurality of pixels, wherein the ultrasonic sensor has a contact layer having a non-uniform thickness overlying the two-dimensional array of ultrasonic transducers and wherein the two-dimensional array of ultrasonic transducers is substantially flat.

At procedure 1220 of flow diagram 1200, a temperature of the ultrasonic sensor is determined. At procedure 1230, a transmission frequency of activated ultrasonic transducers is controlled during the imaging operation, wherein the transmission frequency is controlled based on the temperature of the ultrasonic sensor. The transmission frequency is selected to generate a constant interference pattern across all temperatures. At procedure 1240, at least one fingerprint image is captured using the transmission frequency. At procedure 1250, an interference pattern correction determined or calibrated at an initial temperature state is applied to the fingerprint image to generate the output fingerprint image.

At procedure 1260, the output fingerprint image is output (e.g., for use in fingerprint authentication).

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. An ultrasonic sensor comprising:
an array of ultrasonic transducers;
a contact layer having a non-uniform thickness overlying the array of ultrasonic transducers, such that a thickness of the contact layer is non-uniform over a surface of the array of ultrasonic transducers; and
an array controller configured to control activation of ultrasonic transducers during an imaging operation, the array controller is configured to:
control a transmission frequency of activated ultrasonic transducers during the imaging operation, wherein a plurality of transmission frequencies are used during the imaging operation; and
capture a plurality of portions of a fingerprint image using the plurality of transmission frequencies such that each portion of the plurality of portions of the fingerprint image is captured using one transmission frequency of the plurality of transmission frequencies.

2. The ultrasonic sensor of claim 1, wherein the array controller is configured to capture a plurality of fingerprint images using the plurality of transmission frequencies.

3. The ultrasonic sensor of claim 2, wherein the array controller is further configured to combine the plurality of fingerprint images into a single output fingerprint image, wherein the single output fingerprint image reduces an impact of an interference pattern caused by the non-uniform thickness of the contact layer.

4. The ultrasonic sensor of claim 3, wherein the array controller is configured to combine the plurality of fingerprint images into a single output fingerprint image by averaging the plurality of fingerprint images.

5. The ultrasonic sensor of claim 3, wherein the array controller is configured to combine the plurality of fingerprint images into a single output fingerprint image by combining the plurality of fingerprint images using convolution.

6. The ultrasonic sensor of claim 2, wherein the plurality of fingerprint images are captured at different temperatures and wherein the transmission frequency is controlled based on temperature.

7. The ultrasonic sensor of claim 1, wherein the array controller is configured to combine the plurality of portions of the fingerprint image to generate the fingerprint image.

8. The ultrasonic sensor of claim 7, wherein the plurality of transmission frequencies provide constructive interference for corresponding portions of the plurality of portions of the fingerprint image during the imaging operation.

9. The ultrasonic sensor of claim 1, wherein portions of the plurality of portions comprise a plurality of pixels.

10. The ultrasonic sensor of claim 1, wherein portions of the plurality of portions comprise a single pixel.

11. A method for generating an image at an ultrasonic sensor, the method comprising:
performing an imaging operation at an ultrasonic sensor comprising an array of ultrasonic transducers and a contact layer having a non-uniform thickness overlying the array of ultrasonic transducers, such that a thickness of the contact layer is non-uniform over a surface of the array of ultrasonic transducers, comprising:
controlling a transmission frequency of activated ultrasonic transducers during the imaging operation, wherein a plurality of transmission frequencies are used during the imaging operation; and capturing a plurality of portions of a fingerprint image using the plurality of transmission frequencies such that each portion of the plurality of portions of the fingerprint image is captured using one transmission frequency of the plurality of transmission frequencies.

12. The method of claim 11, wherein the capturing the plurality of portions of a fingerprint image using the plurality of transmission frequencies comprises:

capturing a plurality of fingerprint images using the plurality of transmission frequencies.

13. The method of claim 12, wherein the plurality of transmission frequencies operate to cancel out an interference pattern of the plurality of fingerprint images.

14. The method of claim 12, the method further comprising:

combining the plurality of fingerprint images into a single output fingerprint image, wherein the single output fingerprint image reduces an impact of an interference pattern caused by the non-uniform thickness of the contact layer.

15. The method of claim 14, wherein the combining the plurality of fingerprint images into the single output fingerprint image comprises:

combining the plurality of fingerprint images into a single output fingerprint image by averaging the plurality of fingerprint images.

16. The method of claim 14, wherein the combining the plurality of fingerprint images into the single output fingerprint image comprises:

combining the plurality of fingerprint images into a single output fingerprint image by combining the plurality of fingerprint images using convolution.

17. The method of claim 11, further comprising:

combining the plurality of portions of the fingerprint image to generate a single output fingerprint image.

18. The method of claim 17, wherein the plurality of transmission frequencies provide constructive interference for corresponding portions of the plurality of portions of the fingerprint image during the imaging operation.

19. The method of claim 11, wherein portions of the plurality of portions comprise a plurality of pixels.

20. A non-transitory computer readable storage medium having computer readable program code stored thereon for causing a computer system to perform a method for generating an image at an ultrasonic sensor, the method comprising:

performing an imaging operation at an ultrasonic sensor comprising an array of ultrasonic transducers and a contact layer having a non-uniform thickness overlying the array of ultrasonic transducers, such that a thickness of the contact layer is non-uniform over a surface of the array of ultrasonic transducers, comprising:

controlling a transmission frequency of activated ultrasonic transducers during the imaging operation, wherein a plurality of transmission frequencies are used during the imaging operation; and capturing a plurality of portions of a fingerprint image using the plurality of transmission frequencies such that each portion of the plurality of portions of the fingerprint image is captured using one transmission frequency of the plurality of transmission frequencies.

* * * * *